United States Patent
Matsubara et al.

(10) Patent No.: US 10,880,364 B2
(45) Date of Patent: Dec. 29, 2020

(54) APPLICATION MANAGEMENT APPARATUS, INFORMATION PROCESSING SYSTEM, AND RECORDING MEDIUM STORING THEREIN APPLICATION MANAGEMENT PROGRAM

(71) Applicant: FUJITSU LIMITED, Kawasaki (JP)

(72) Inventors: Takuya Matsubara, Numazu (JP); Kazuyoshi Watanabe, Tagata (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/836,980

(22) Filed: Apr. 1, 2020

(65) Prior Publication Data
US 2020/0322424 A1 Oct. 8, 2020

(30) Foreign Application Priority Data
Apr. 8, 2019 (JP) .................. 2019-073523

(51) Int. Cl.
*H04L 29/08* (2006.01)
(52) U.S. Cl.
CPC .............. *H04L 67/1004* (2013.01)
(58) Field of Classification Search
None
See application file for complete search history.

(56) References Cited

U.S. PATENT DOCUMENTS

| | | | | |
|---|---|---|---|---|
| 6,769,121 B1 * | 7/2004 | Koyama | ............... | G06F 9/4862 709/201 |
| 8,352,942 B2 * | 1/2013 | Shimogawa | .......... | G06F 9/5088 718/1 |
| 8,468,230 B2 * | 6/2013 | Murata | ................. | G06F 9/5077 709/223 |
| 8,661,210 B2 * | 2/2014 | Tanabe | ................. | G06F 3/0647 711/161 |
| 8,688,773 B2 * | 4/2014 | Dayley | ............... | G06F 11/2097 709/203 |
| 8,745,210 B2 * | 6/2014 | Sekiguchi | ............. | G06F 9/4856 709/224 |
| 8,893,118 B2 * | 11/2014 | Guminy | .................... | G06F 8/70 717/175 |
| 8,893,123 B2 * | 11/2014 | Miyamoto | .......... | G06F 11/3089 718/1 |
| 8,898,394 B2 * | 11/2014 | Kondo | ................. | G06F 3/0649 711/143 |
| 9,244,731 B2 * | 1/2016 | Siu | ....................... | G06F 9/45558 |
| 9,294,585 B2 * | 3/2016 | Druet | ..................... | H04L 67/34 |
| 10,754,686 B2 * | 8/2020 | Guo | ....................... | G06F 9/4856 |

(Continued)

FOREIGN PATENT DOCUMENTS

| | | |
|---|---|---|
| JP | 2000-099435 A | 4/2000 |
| JP | 2000-322350 A | 11/2000 |
| JP | 2001-175560 A | 6/2001 |

*Primary Examiner* — Backhean Tiv
(74) *Attorney, Agent, or Firm* — Fujitsu Patent Center

(57) ABSTRACT

An application management apparatus manages a migration of an application, running on a first computer communicating with a second computer, to a third computer. The management apparatus receives and records status of the first computer from the first computer, and receives and records status of the migration from the third computer. When receiving an inquiry from the second computer, notifying the second computer of the status of the application and the migration target computer.

9 Claims, 23 Drawing Sheets

(56) References Cited

U.S. PATENT DOCUMENTS

| | | | | |
|---|---|---|---|---|
| 2005/0154849 A1* | 7/2005 | Watanabe | G06F 3/0607 | 711/165 |
| 2005/0278492 A1* | 12/2005 | Stakutis | G06F 11/2082 | 711/161 |
| 2008/0086616 A1* | 4/2008 | Asano | G06F 3/0647 | 711/165 |
| 2008/0098385 A1* | 4/2008 | Alger | G06F 11/3684 | 717/174 |
| 2008/0273457 A1* | 11/2008 | Sun | G06F 11/1425 | 370/221 |
| 2009/0106409 A1* | 4/2009 | Murata | G06F 9/4856 | 709/223 |
| 2010/0274766 A1* | 10/2010 | Nagashima | G06F 11/3433 | 707/654 |
| 2011/0161491 A1* | 6/2011 | Sekiguchi | G06F 9/4856 | 709/224 |
| 2012/0036330 A1* | 2/2012 | Saito | G06F 3/0647 | 711/162 |
| 2012/0297016 A1* | 11/2012 | Iyer | G06F 11/0772 | 709/217 |
| 2013/0024639 A1* | 1/2013 | Yamamoto | G06F 3/0635 | 711/165 |
| 2013/0085989 A1* | 4/2013 | Nayyar | G06F 16/119 | 707/610 |
| 2013/0311740 A1* | 11/2013 | Watanabe | G06F 3/0647 | 711/165 |
| 2014/0089393 A1* | 3/2014 | Druet | H04L 67/34 | 709/203 |
| 2014/0181804 A1* | 6/2014 | Sakata | H04L 67/1097 | 718/1 |
| 2014/0201267 A1* | 7/2014 | Yang | H04W 4/00 | 709/203 |
| 2015/0324227 A1* | 11/2015 | Sizemore | G06F 9/48 | 718/1 |
| 2016/0253339 A1* | 9/2016 | Ambrose | G06F 3/0647 | 707/693 |
| 2017/0161212 A1* | 6/2017 | Campbell | G06F 13/4081 | |
| 2018/0074748 A1* | 3/2018 | Makin | G06F 3/0604 | |
| 2018/0091591 A1* | 3/2018 | Puri | H04L 43/10 | |
| 2018/0285099 A1* | 10/2018 | Mandava | G06F 8/76 | |
| 2019/0042138 A1* | 2/2019 | Guim Bernat | G06F 3/0614 | |
| 2019/0129616 A1* | 5/2019 | Nguyen | G06F 3/0605 | |
| 2019/0235918 A1* | 8/2019 | Liu | G06F 3/0647 | |
| 2019/0377598 A1* | 12/2019 | Xia | G06F 21/64 | |

* cited by examiner

FIG. 20

⇒ START OF MANAGER MIGRATION (RETURN TO SERVER #1)

| | COMMUNICATION SOURCE | | | COMMUNICATION RECEIVER | | | CONVERSION TARGET | |
|---|---|---|---|---|---|---|---|---|
| | IP ADDRESS | SOFTWARE ID | STATUS | IP ADDRESS | SOFTWARE ID | STATUS | IP ADDRESS | STATUS |
| 441 → | 10.100.100.10 | MNG | MIGRATED | 10.100.100.20 | AGT | COMMUNICATION-ENABLED | null | null |
| 442 → | 10.100.100.20 | AGT | COMMUNICATION-ENABLED | 10.100.100.10 | MNG | MIGRATED | 10.100.100.30 | COMMUNICATION-ENABLED |
| 443 → | 10.100.100.20 | AGT | COMMUNICATION-ENABLED | 10.100.100.30 | MNG | MIGRATING | null | null |
| 444 → | 10.100.100.30 | MNG | MIGRATING | 10.100.100.20 | AGT | COMMUNICATION-ENABLED | null | null |

⇒ COMPLETION OF MANAGER MIGRATION

| | COMMUNICATION SOURCE | | | COMMUNICATION RECEIVER | | | CONVERSION TARGET | |
|---|---|---|---|---|---|---|---|---|
| | IP ADDRESS | SOFTWARE ID | STATUS | IP ADDRESS | SOFTWARE ID | STATUS | IP ADDRESS | STATUS |
| 441 → | 10.100.100.10 | MNG | COMMUNICATION-ENABLED | 10.100.100.20 | AGT | COMMUNICATION-ENABLED | null | null |
| 442 → | 10.100.100.20 | AGT | COMMUNICATION-ENABLED | 10.100.100.10 | MNG | COMMUNICATION-ENABLED | null | null |
| 443 → | 10.100.100.20 | AGT | COMMUNICATION-ENABLED | 10.100.100.30 | MNG | MIGRATED | 10.100.100.10 | COMMUNICATION-ENABLED |
| 444 → | 10.100.100.30 | MNG | MIGRATED | 10.100.100.20 | AGT | COMMUNICATION-ENABLED | null | null |

APPLICATION MANAGEMENT APPARATUS, INFORMATION PROCESSING SYSTEM, AND RECORDING MEDIUM STORING THEREIN APPLICATION MANAGEMENT PROGRAM

CROSS-REFERENCE TO RELATED APPLICATION

This application is based upon and claims the benefit of priority of the prior Japanese Patent Application No. 2019-73523, filed on Apr. 8, 2019, the entire contents of which are incorporated herein by reference.

FIELD

The embodiments discussed herein are related to an application management apparatus, an information processing system, and a recording medium storing therein an application management program.

BACKGROUND

On information processing apparatuses included in an information processing system, various kinds of application software (hereinafter also simply referred to as an application or software in some cases) run. It is often the case that such an information processing system is equipped with a mechanism to manage the statuses of applications (for example, whether each application is normally operating or stopped due to a failure).

As an example of this technique, proposed is the following network communication management system. In this system, each computer sequentially notifies another computer of the activated or stopped status of a server application on a certain computer, so that each computer is enabled to manage the status of the server application. Related technique is disclosed in, for example, Japanese Laid-open Patent Publication No. 2001-175560.

Regarding server switching, also proposed is the following client server system. In this system, when a client transmits, a signal to a certain server in which a factor of server switching has occurred, a coupling server switching apparatus transmits the signal after rewriting the destination address of the signal so as to deliver the signal to a server to which the certain server is switched. Related technique is disclosed in, for example, Japanese Laid-open Patent Publication No. 2000-322350.

In an information processing system, an application running on a certain information processing apparatus is migrated to another information processing apparatus in some cases. For example, in the case where an information processing apparatus on which an application is running is aged or runs out of its resources, the application is migrated to another information processing apparatus.

In the case where an application running on a first information processing apparatus is migrated to a third information processing apparatus while the application and a second information processing apparatus are communicating with each other, the second information processing apparatus fails to communicate with the pre-migration application. In order to enable the second information processing apparatus to communicate with the post-migration application, a mechanism is required to enable the second information processing apparatus to recognize that the application is migrated and know information on the apparatus to which the application is migrated. However, there are problems in how the second information processing apparatus determines a procedure to continue the communication with the application and how to establish a simple mechanism that carries out processing for enabling the determination.

In an aspect of the disclosure, provided are a management apparatus, an information processing system, and a recording medium storing therein a management program that are made capable of notifying an information processing apparatus, which fails to communicate with an application, of information for determining a procedure to continue the communication through simple processing.

SUMMARY

According to an aspect of the embodiments, an application management apparatus manages a migration of an application, running on first computer communicating with second computer, to a third computer. The management apparatus receives and records a status of the first computer from the first computer, and receives and records a status of the migration from the third computer. When receiving an inquiry from the second computer, notifying the second computer of the status of the application and the migration target computer.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 20 is a diagram illustrating the example of the transition of the status management information (No. 2);

DESCRIPTION OF EMBODIMENTS

Hereinafter, description is given of embodiments of the present disclosure with reference to the drawings.

First Embodiment

Figure 1:
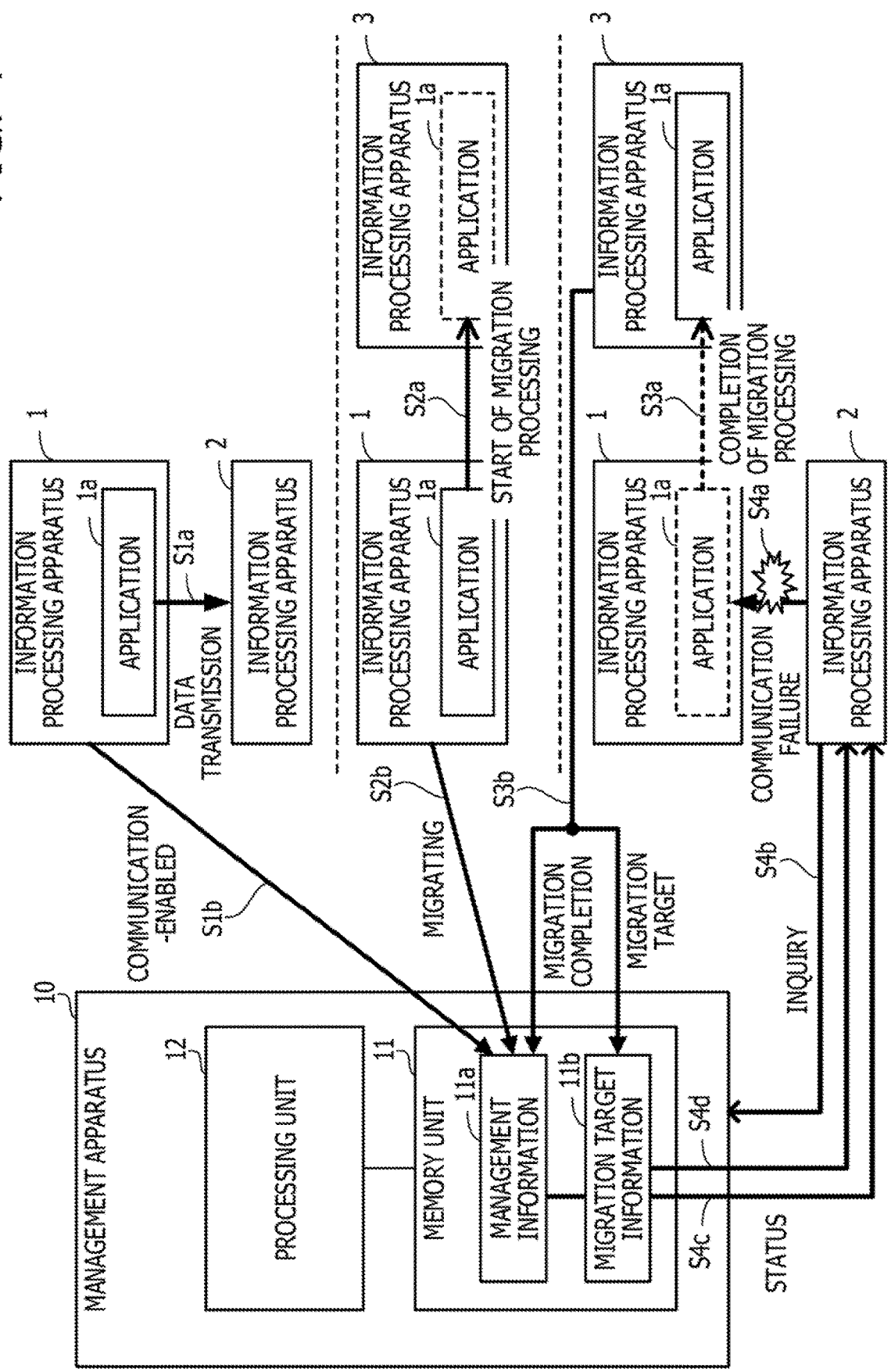
FIG. 1 is a diagram illustrating a configuration example and a processing example of an information processing system according to a first embodiment.

FIG. 1 is a diagram illustrating a configuration example and a processing example of an information processing system according to a first embodiment. The information processing system illustrated in FIG. 1 includes information processing apparatuses 1 to 3 and a management apparatus 10.

An application 1a communicating with the information processing apparatus 2 runs on the information processing apparatus 1. The processing of the application 1a is implemented, for example, by executing a predetermined application program using a processor included in the information processing apparatus 1. The application 1a may be regarded as a set of processes executed in accordance with the application program. The information processing apparatus 2 communicates with the application 1a. In the present embodiment, the information processing apparatus 3 is used as a migration target to which the application 1a is migrated. After the application 1a is migrated to the information processing apparatus 3, the application 1a on the information processing apparatus 3 communicates with the information processing apparatus 2.

The management apparatus 10 includes a memory unit 11 and a processing unit 12. The memory unit 11 is, for example, a memory device included in the management apparatus 10. The memory unit 11 stores therein management information 11a for managing the status of the application 1a on the information processing apparatus 1, and migration target information 11b indicating a migration target of the application 1a. The processing unit 12 is, for example, a processor included in the management apparatus 10. The processing unit 12 receives status information from the information processing apparatus 1, and records a status of the application 1a indicated by the received status information into the management information 11a. When an inquiry is received from the information processing apparatus 2, the processing unit 12 notifies the information processing apparatus 2 of the status of the application 1a based on the management information 11a. In FIG. 1, the thick arrows indicate sources and destinations of information to be sent in the respective steps.

Hereinafter, description is given of a processing example in the information processing system. In response to data transmission from the application 1a to the information processing apparatus 2 (step S1a), the information processing apparatus 1 transmits, to the management apparatus 10, status information indicating that the application 1a is able to normally communicate (step S1b). The processing unit 12 in the management apparatus 10 records the status of the application 1a indicated by the received status information (for example, the communication-enabled status) into the management information 11a.

Then, in response to a start of migration processing of migrating the application 1a from the information processing apparatus 1 to the information processing apparatus 3 (step S2a), the information processing apparatus 1 transmits, to the management apparatus 10, status information indicating that the application 1a is migrating (step S2b). The processing unit 12 in the management apparatus 10 records the status of the application 1a indicated by the received status information (for example, the migrating status) into the management information 11a.

Upon completion of the migration of the application 1a (step S3a), the information processing apparatus 3 transmits status information indicating that the application 1a is already migrated and the migration target information 11b indicating the migration target of the application 1a to the management apparatus 10 (step S3b). The migration target information 11b is information indicating the information processing apparatus 3, and specifies, for example, a network address of the information processing apparatus 3. The processing unit 12 in the management apparatus 10 records the status of the application 1a indicated by the received status information (for example, the migrated status) into the management information 11a, and stores the received migration target information 11b into the memory unit 11.

Meanwhile, when the information processing apparatus 2 fails to communicate with the application 1a that used to run on the information processing apparatus 1 (step S4a), the information processing apparatus 2 transmits an inquiry about the status of the application 1a to the management apparatus 10 (step S4b). When receiving the inquiry, the processing unit 12 in the management apparatus 10 notifies the information processing apparatus 2 of the status of the application 1a based on the management information 11a (step S4c). When the migrated status of the application 1a is recorded in the management information 11a, the processing unit 12 transmits the migration target information 11b together with the status, notification to the information processing apparatus 2 (step S4d).

In this way, the information processing apparatus 2 is enabled to recognize the status of the communication receiver application 1a by transmitting the inquiry to the management apparatus 10. For example, when failing to communicate with the application 1a, the information processing apparatus 2 is enabled to determine that the application 1a has no failure and it is possible to continue the communication with the application is in any case where the application 1a is able to communicate, is migrating, or is already migrated. Thereafter, the information processing apparatus 2 may re-execute the communication with the application 1a based on this determination result.

For example, in the case where the management apparatus 10 notifies the information processing apparatus 2 that the application 1a is migrating in response to the transmission of the inquiry, the information processing apparatus 2 re-executes the communication with the application 1a with the information processing apparatus 1 set as the communication receiver after a predetermined time. In this re-execution, if the application 1a is already migrated to the information processing apparatus 3, the information processing apparatus 2 fails to communicate again and transmits an inquiry to the management apparatus 10, and the management apparatus 10 transmits a notification that the application 1a is already migrated and the migration target information 11b. Based on these kinds of information, the information processing apparatus 2 is enabled to recognize that the application 1a is already migrated to the information processing apparatus 3, change the setting of the transmission destination, and re-execute the communication with the application 1a with the migration target information processing apparatus 3 set as the communication receiver. Since the communication is successful in this re-execution, the information processing apparatus 2 is enabled to continue the communication with the application 1a.

As described above, in the first embodiment, it is possible to note the information processing apparatus 2, which fails to communicate with the application 1a, of the information for determining a procedure to continue the communication. By receiving this notification, the information processing apparatus 2 is enabled to determine an appropriate procedure to continue the communication depending on the status of the application 1a such as re-transmitting the transmission information and/or changing the setting of the transmission destination. In addition, it is possible to simply achieve the processing for enabling such a notification.

The information processing apparatus 1 notifies the management apparatus 10 of the status of the application 1a at the occasion of execution of each of existing processes for the application 1a including data transmission, migration start, and migration completion. The processing for the status notification may be simplified as compared with the case where the information processing apparatus 1 notifies the management apparatus 10 of the status of the application 1a through a process independent of these processes (for example, notifies on a regular basis).

The management apparatus 10 does not detect the status of the application 1a by making a request from the management apparatus 10 by polling or the like, but recognizes the status of the application 1a through an autonomous status notification from the information processing apparatus 1. The management apparatus 10 provides the information on the status of the application 1a in response to the inquiry from the information processing apparatus 2. This makes it possible to simplify the processing for status management and information provision by the management apparatus 10.

Therefore, in the first embodiment, it is possible to notify the information processing apparatus 2, which fails to communicate with the application 1a, of the information for determining a procedure to continue the communication through the simple processing.

Second Embodiment

Figure 2:
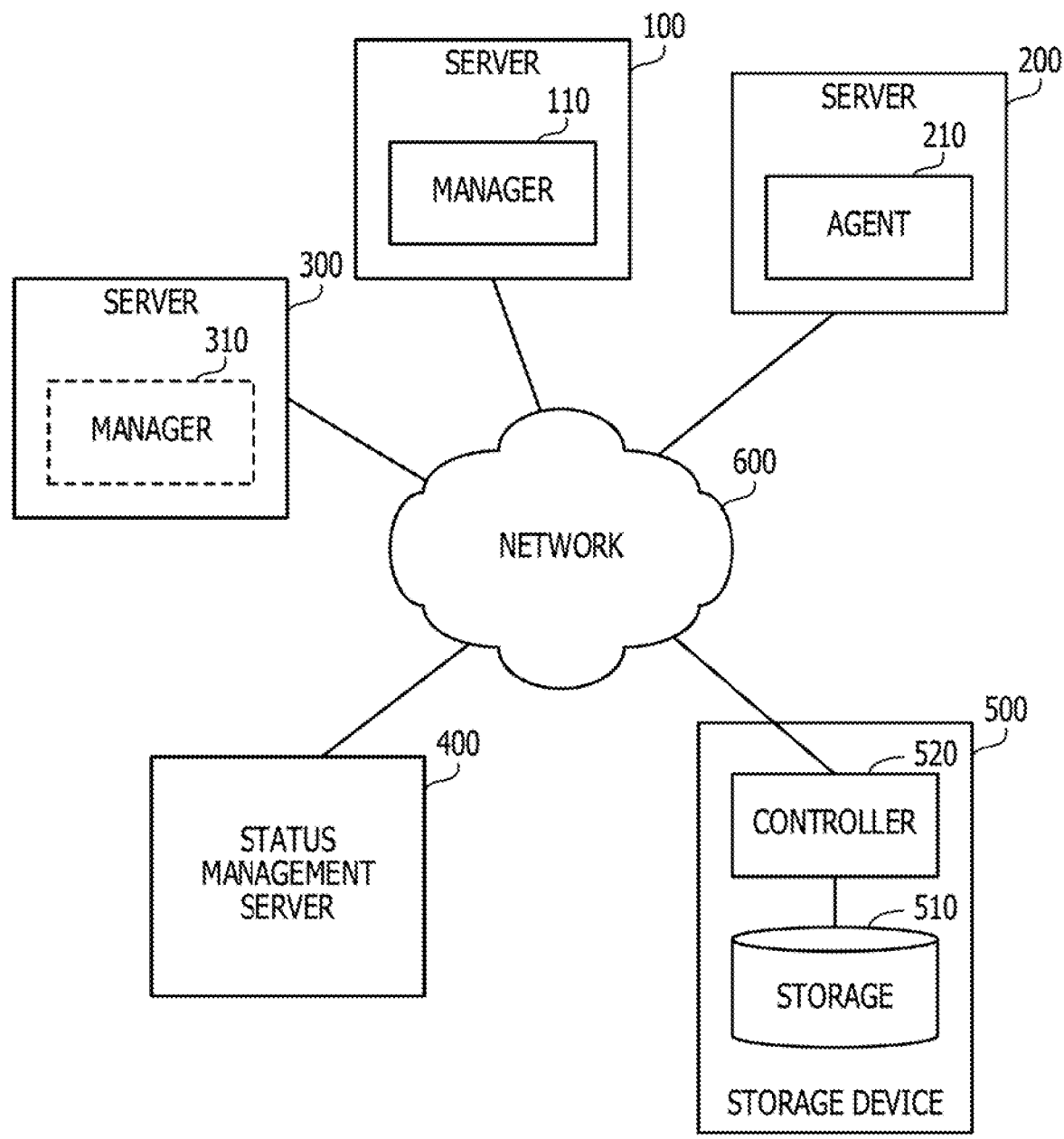
FIG. 2 is a diagram illustrating a configuration example of an information processing system according to a second embodiment.

FIG. 2 is a diagram illustrating a configuration example of an information processing system according to a second embodiment. The information processing system illustrated in FIG. 2 includes servers 100, 200, and 300, a status management server 400, and a storage device 500. These servers and device are coupled to each other via a network 600.

The servers 100, 200, and 300 are general-purpose server computers on which various kinds of application software (application programs) are executed. The status management server 400 is a server computer that manages the statuses of the servers 100, 200, and 300. The status management server 400 may be also prepared by using a general-purpose server like the servers 100, 200, and 300.

The storage device 500 includes a storage 510 and a controller 520. In the storage 510, multiple non-volatile memory devices such as a hard disk drive (HDD) and a solid-state drive (SSD) are mounted. The controller 520 is a storage controller that controls accesses to the storage 510.

For example, the controller 520 generates logical volumes using, the memory devices in the storage 510. The controller 520 accesses the storage 510 when receiving an access to any of the logical volumes from a server which performs task processing (task server) among the servers 100, 200, and 300. The controller 520 is capable of executing backup processing in which data in a logical volume is baked up in another logical volume by using any of the memory devices in the storage 510.

In the case where the logical volumes are virtual volumes, the controller 520 is capable of dynamically allocating physical areas to the virtual volumes. In the case where multiple types of memory devices different in access performance are mounted on the storage 510, the controller 520 is capable of dynamically changing the physical area allocated to each virtual volume depending on the frequency of accesses to the virtual volume from the task server from one memory device to another among the memory devices different in access performance. Such allocation change processing is called storage tiering control.

In the initial state, the server 100 includes a manager 110 related to control of the storage device 500, and the server 200 includes an agent 210 related to control of the storage device 500. Both of the manager 110 and the agent 210 are examples of applications implemented by application software. For example, the manager 110 retains management information related to logical volumes usable by task processing in the server 200. The manager 110 is capable of specifying a process target logical volume based on this management information and instructing the agent 210 to execute the backup processing of the logical volume or change the memory area allocated to the logical volume under the tiering control. In accordance with an instruction from the manager 110, the agent 210 instructs the controller 520 of the storage device 500 to execute the backup processing or change the memory area under the tiering control. Thus, the agent 210 acts as an intermediary for execution instructions for storage control from the manager 110.

There is a case where an application is migrated from one server to another server among the servers 100, 200, and 300. For example, depending on a processing load or resource usage state in a certain server, an application running on the certain server is migrated to a different server and the application is caused to run on the latter server. The following description explains the case where the manager 110 on the server 100 is migrated to the server 300. The manager 310 illustrated in FIG. 2 represents the post-migration manager which is migrated to the server 300 and is enabled to take over the processing of the manager 110.

Figure 3:
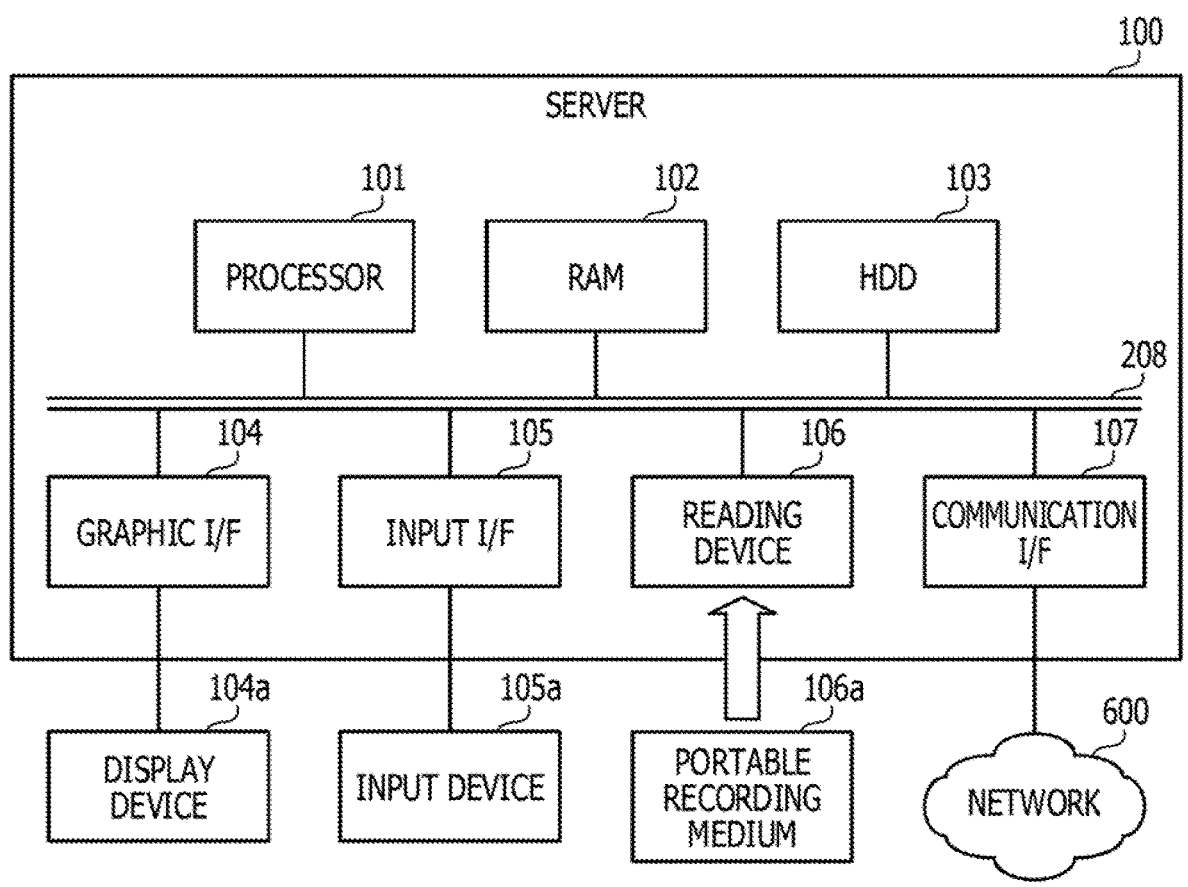
FIG. 3 is a diagram illustrating a hardware configuration example of a server.

FIG. 3 is a diagram illustrating a hardware configuration example of a server. FIG. 3 illustrates the server 100 among the servers 100, 200, and 300. The server 100 is implemented, for example, as a computer as illustrated in FIG. 3. The server 100 illustrated in FIG. 3 includes a processor 101, a random-access memory (RAM) 102, an HDD 103, a graphic interface (I/F) 104, an input interface (I/F) 105, a reading device 106, and a communication interface (I/F) 107.

The processor 101 centrally controls the entire server 100. The processor 101 is, for example, a central processing unit (CPU), a microprocessor unit (MPU), a digital signal processor (DSP), an application specific integrated circuit (ASIC), or a programmable logic device (PLD). The processor 101 may be a combination of two or more elements from among CPUs, MPUs DSPs, ASICs, and PLDs.

The RAM 102 is used as a main memory device of the server 100, In the RAM 102, at least a part of an operating system (OS) program and application software to be executed by the processor 101 is, temporarily stored. In the RAM 102, various kinds of data for use in processing by the processor 101 are stored.

The HDD 103 is used as an auxiliary memory device of the server 100. In the HDD 103, the OS program, the application software, and various kinds of data are stored. Another type of nonvolatile memory device such as an SSD may be used as the auxiliary storage device.

To the graphic interface 104, a display device 104a is coupled. The graphic interface 104 displays an image on the display device 104a in accordance with a command from the processor 101. Examples of the display device 104a include a liquid crystal display and an organic electroluminescence (EL) display.

To the input interface 105, an input device 105a is coupled. The input interface 105 transmits a signal outputted from the input device 105a to the processor 101. Examples of the input device 105a include a keyboard and a pointing device, Examples of the pointing device include a mouse, a touch panel, a tablet, a touch pad, and a track ball.

A portable recording medium 106a is removably mounted on the reading device 106. The reading device 106 reads data recorded in the portable recording medium 106a and transmits the data to the processor 101. Examples of the portable recording medium 106a include an optical disk, a magneto-optical disk, and a semiconductor memory.

The communication interface 107 transmits and receives data to and from other apparatuses such as the server 200 via the network 600. With the hardware configuration as described above, processing functions of the server 100 may be implemented. Each of the servers 200 and 300, the status management server 400, and the controller 520 may be also implemented as a computer having the hardware configuration as illustrated in FIG. 3.

Figure 4:
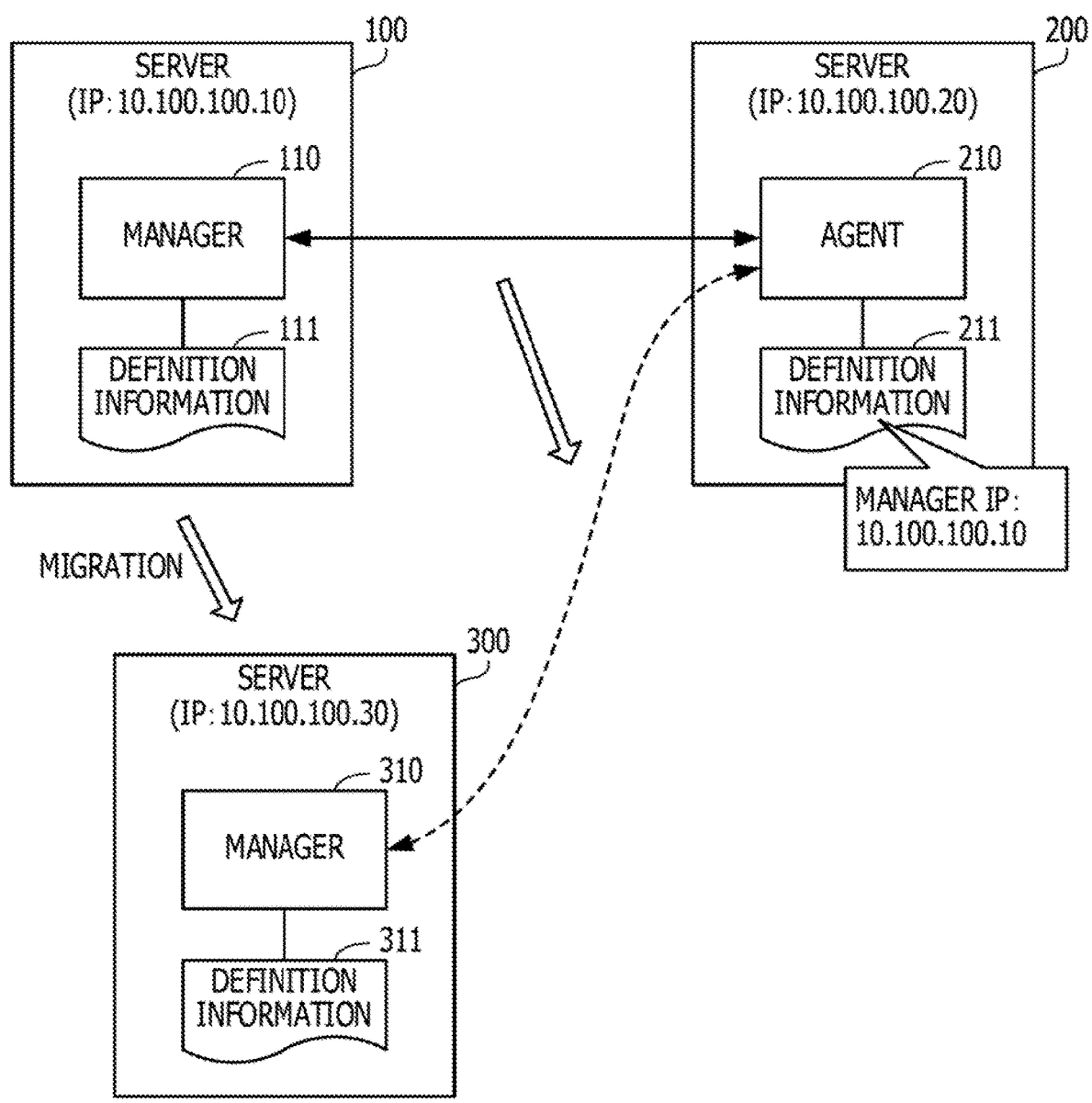
FIG. 4 is a diagram for explaining inter-server migration of an application.

FIG. 4 is a diagram for explaining inter-server migration of an application. As illustrated in FIG. 4, the manager 110 runs on the server 100 and the agent 210 runs on the server 200. Since the agent 210 runs in accordance with instructions from the manager 110 as described above, the manager 110 and the agent 210 communicate with each other.

The server 100 retains definition information 111 in which various kinds of data for use in processing by the manager 110 are set. The manager 110 executes the processing by referring to the definition information 111. Similarly, the server 200 retains definition information 211 in which various kinds of data for use in processing by the agent 210 are set. The agent 210 executes the processing by referring to the definition information 211.

The definition information 111 and 211 contains, for example, an Internet protocol (IP) address of a server on which a communication receiver application runs. In this example, the IP address of the server 100 is "10.100.100.10" and the IP address of the server 200 is "10.100.100.20". In this case, for example, "10.100.100.10" is set as the IP address of the communication target server 100 (indicated by "MANAGER IP" in FIG. 4) in the definition information 211 for the agent 210.

In the case of migrating the manager 110 from the server 100 to the server 300, processing has to be executed in which the application software and the definition information 111 for the manager 110 are set up on the migration target server 300. In some cases, such migration processing may be executed, for example, automatically by using a migration tool for the manager 110.

However, the execution of the above migration processing alone is not enough to enable the agent 210 to communicate with the manager 310 on the migration target. This is because the IP address of the server 100 is still set as the communication receiver server IP address in the definition information 211 of the agent 210 and the agent 210 is enabled to communicate only with the server 100 based on this definition information 211.

In order to enable the agent 210 to communicate with the manager 310 on the migration target, for example, the IP address of the migration target server 300 has to be reset to the same value as the migration source server 100. In the example of FIG. 4, the IP address of the server 300 is "10.100.100.30", and has to be reset to "10.100.100.10" that is the same as the server 100.

For example, when all the functions of the server 100 are migrated to the server 300, the IP address of the communication receiver of the server 200 may be reset from the server 100 to the server 300. In the present embodiment, however, the inter-server migration is preformed not on a server by-server basis, but on an application-by-application basis. In a possible example, due to a shortage of resources in the server 100, a certain application on the server 100 is migrated to the server 300 having sufficient available resources and another application on the server 100 is migrated to a different server having sufficient available resources other than the server 300. For this, reason, the communication receiver IP address has to be reset for each of combinations of servers and an application, which requires a lot of work.

The agent 210 is disabled from communicating with the manager 110 during execution of the migration processing of the manager 110. When the agent 210 tries to communicate with the manager 110 but fails, the agent 210 which does not know the status of the manager 110 has no way to determine why the communication fails, and therefore is only able to determine that an error whose cause is not identifiable occurs. In this situation, for example, the agent 210 is able to notify a management terminal coupled to the server 200 of only the occurrence of the error and is unable to notify it of the detailed information of the error.

The above description given of the migration of the manager 110, but the same or similar problem occurs in the case where the agent 210 is migrated to a different server.

Figure 5:
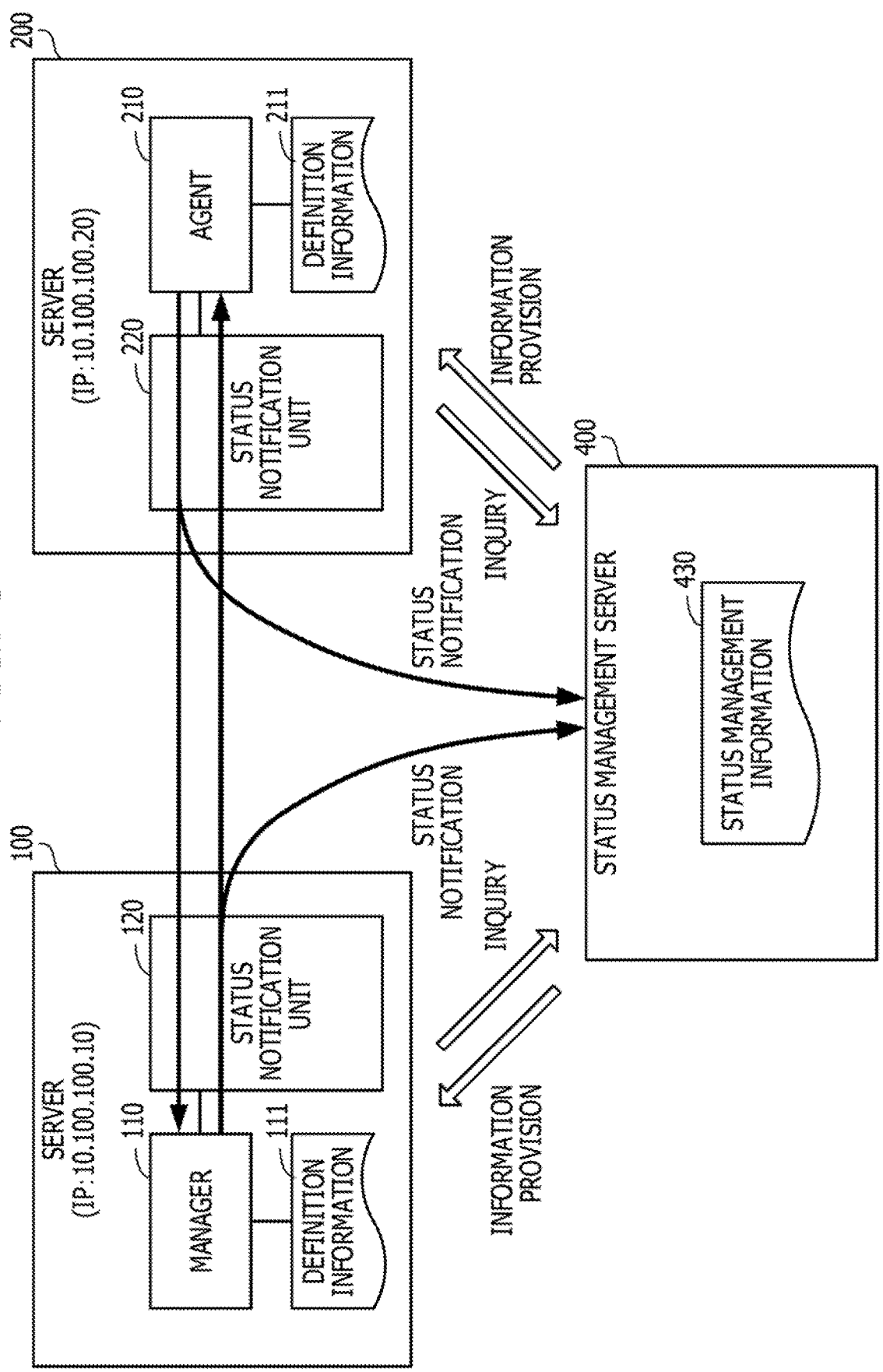
FIG. 5 is a diagram illustrating an outline of server status management using a status management server.

FIG. 5 is a diagram illustrating an outline of server status management using a status management server. In the present embodiment, the statuses of the servers 100, 200, and 300 are managed by using the status management server 400, and each of the servers 100, 200, and 300 is enabled to recognize the status of its communication receiver by receiving information provision from the status management server 400. The server 300 is not shown in FIG. 5.

The status management server 400 retains status management information 430 in which the statuses of applications running on the servers 100, 200, and 300 are registered. The servers 100, 200, and 300 are each provided with a status notification unit that enables communication with the status management server 400. For example, as illustrated in FIG. 5, the server 100 is provided with a status notification unit 120 for the manager 110 and the server 200 is provided with a status notification unit 220 for the agent 210.

The status management server 400 is notified of the statuses of the applications on the servers 100, 200, and 300 through autonomous data transmission from the respective servers 100, 200, and 300. For example, the status notification unit 120 autonomously notifies the status management server 400 of the status of the manager 110 on the server 100. The status notification unit 120 inquires of the status management server 400 the status of the agent 210 on the server 200, and receives the information on the status provided by the status management server 400. Similarly, the status notification unit 220 autonomously notifies the status management server 400 of the status of the agent 210 on the server 200. The status notification unit 220 inquires of the status management server 400 the status of the manager 110 on the server 100, and receives the information on the status provided by the status management server 400.

For example, as for the status of the manager 110, the status management information 430 at least retains any one of statuses where the manager 110 is able to communicate with the agent 210, where the manager 110 is migrating into a different server, and where the manager 110 is already migrated to a different server. When the manager 110 is already migrated, the status management information 430 also retains information on the migration target server.

When the agent 210 fails to communicate with the manager 110, the status notification unit 220 inquires of the status management server 400 the status of the manager 110. When the manager 110 is migrating or is already migrated, the status notification unit 220 recognizes the status of the manager 110 based on response information from the status management server 400, and notifies the agent 210 of the status of the manager 110.

When the manager 110 is already migrated, the status notification unit 220 receives the IP address of the migration target server from the status management server 400. In the second embodiment, the status notification unit 220 retains the received IP address. After that, when detecting transmission information addressed from the agent 210 to the manager 110 on the server 100, the status notification unit 220 transmits the transmission information with the IP address of the transmission destination converted to the IP address of the migration target server. This makes it possible to omit the manual changing work of setting the IP address of the migration target server.

In an example assumed herein, the manager 110 on the server 100 communicating with the agent 210 on the server 200 is migrated to the server 300. Along with this, another application running on the server 100 and communicating with another application (referred to the first application) running on the server 200 is migrated to still another server. According to the present embodiment, after the migration processing of these applications is completed, both the communicator receiver of the manager 110 and the communication receiver of the first application are automatically converted to the respective migration target servers. This makes it unnecessary to reset the communication receiver IP addresses in the definition information 211 for the agent 210 and the definition information for the first application, and therefore leads to improvement of the efficiency of migration work.

Figure 6:
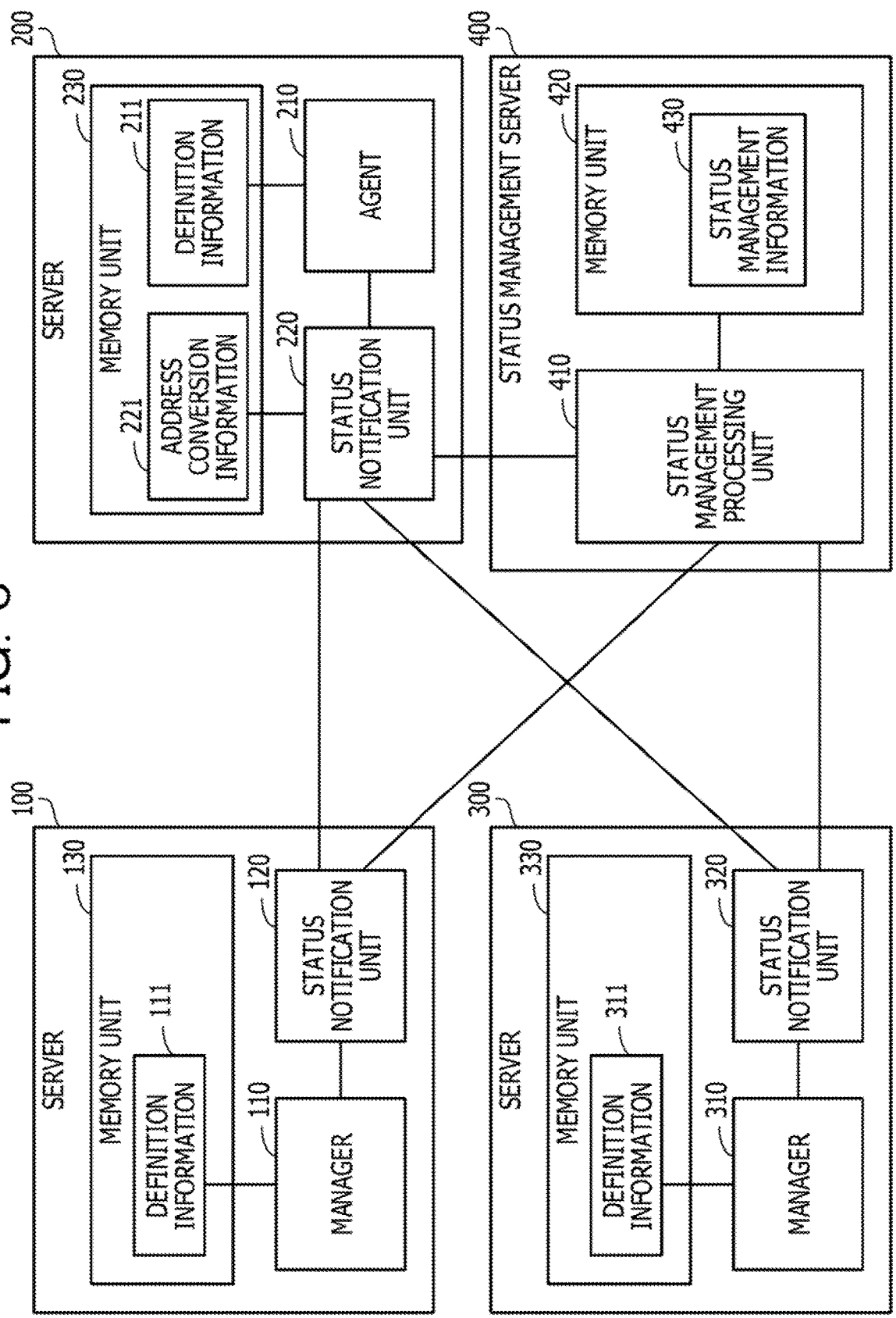
FIG. 6 is a block diagram illustrating a configuration example of processing functions included in servers and the status management sewer.

FIG. 6 is a block diagram illustrating a configuration example of processing functions included in the servers and the status management server. The server 100 includes the manager 110 and status notification unit 120 described above, and a memory unit 130. The processing of the manager 110 and the status notification unit 120 is implemented through execution of a predetermined program by the processor 101. The memory unit 130 is implemented, for example, as a memory area of the memory device such as the RAM 102 or the HDD 103 included in the server 100. The memory unit 130 stores the definition information 111 for the manager 110.

The server 200 includes the agent 210 and status notification unit 220 described above, and a memory unit 230. The processing of the agent 210 and the status notification unit 220 is implemented through execution of a predetermined program by a processor included in the server 200. The memory unit 230 is implemented, for example, as a memory area of a memory device included in the server 200. The memory unit 230 stores the definition information 211 for the agent 210.

The server 300 includes the foregoing manager 310, a status notification unit 320, and a memory unit 330. The processing of the manager 310 and the status notification unit 320 is implemented through execution of a predetermined program by a processor included in the server 300. The memory unit 330 is implemented, for example, as a memory area of a memory device included in the server 300. The memory unit 330 stores definition information 311 for the manager 310. The manager 310, the status notification unit 320, and the definition information 311 are mounted upon completion of the migration of the manager 110 from the server 100 to the server 300.

The status notification unit 120, the status notification unit 220, and the status notification unit 320 execute the same or similar processing for communication of the manager 110 as a transmission source with the agent 210, communication of the agent 210 as a transmission source with the manager 110, and communication of the manager 310 as a transmission source with the agent 210, respectively.

The status notification unit 120, 220, or 320 captures information transmitted from the transmission source application to the transmission destination application. The status notification unit 120, 220, or 320 transmits the captured transmission information to the transmission destination application, and notifies the status management server 400 that the transmission source application is able to communicate.

When the information transmission to the transmission destination application fails, the status notification unit 120, 220, or 320 inquires of the status management server 400 the status of the transmission destination application, and transmits the returned status to the transmission source application. When the transmission destination application is already migrated, the status notification unit 120, 220, or 320 receives the IP address of the migration target server from the status management server 400, and records the received IP address to address conversion information. In the address conversion information, the IP address of the migration source server and the IP address of the migration target server (conversion target IP address) are recorded in association with each other. After that, when the transmission source application outputs transmission information to the transmission destination application, the status notification unit 120, 220, or 320 transmits the transmission information with the IP address of the transmission destination converted to the IP address of the migration target server based on the address conversion information. FIG. 6 illustrates address conversion information 221 for the status notification unit 220. The address conversion information 221 is stored in the memory unit 230, and retains the IP address of the migration source server (for example, the server 100) and the IP address of the migration target server (for example, the server 300) in association with each other.

When the migration processing of migrating the transmission source application to a different server is started, the status notification unit 120, 220, or 320 notifies the status management server 400 that the transmission source application is migrating. When an application currently attended is a post-migration application and the migration processing is completed, the status notification unit 120, 220, or 320 transmits a notification that the application is already migrated and the IP address of the migration target server (the server on which the status notification unit itself is mounted) to the status management server 400.

The status management server 400 includes a status management processing unit 410 and a memory unit 420. The processing of the status management processing unit 410 is implemented through execution of a predetermined program by a processor included in the status management server 400. The memory unit 420 is implemented, for example, as a memory area of a memory device included in the status management server 400. The memory unit 420 stores the status management information 430.

In response to a notification from the status notification unit 120, 220, or 320, the status management processing unit 410 registers information indicating the status of the corresponding transmission source application into the status management information 430. In response to an inquiry from the status notification unit 120, 220, or 320, the status management processing nit 410 refers to the status management information 430 and returns the information indicating the status of the specified transmission destination application. In the status management information 430, information for each of transmission source servers and applications is registered such as the status of the transmission source application and the conversion target server IP address.

Figure 7:
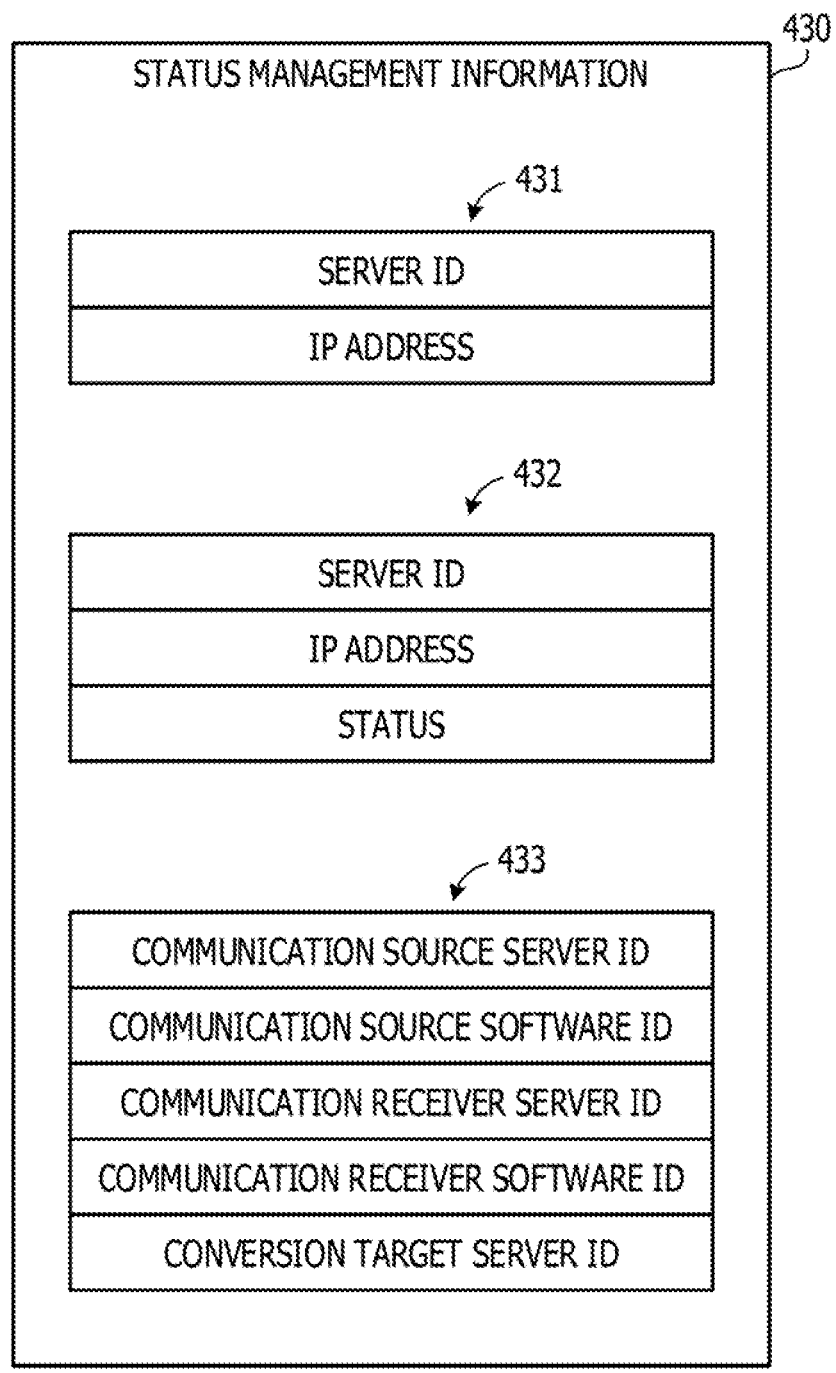
FIG. 7 is a diagram illustrating a configuration diagram of status management information.

FIG. 7 is a diagram illustrating a configuration diagram of status management information. The status management information 430 contains a server table 431, a software table 432, and a communication table 433. The server table 431 is a management table generated for each server, and registers a server ID for identifying the server and the IP address of the server.

The software table 432 is a management table generated for each application software (hereinafter, abbreviated as "software") to be executed on each of the servers. For example, the software table 432 exists for each application running on each of the servers. The software table 432 registers the server ID of the server on which the software is executed, a software ID for identifying the software, and the status of the software.

In a status field, for example, any, one of "communication-enabled", "service stoppage", "software failure", "migrating", and "migrated" is registered. The "communication-enabled" indicates a status where the software is able to communicate. The "service stoppage" indicates that the service to be provided by the software is stopped. The "software failure" indicates that a failure of the software is occurring. The "migrating" indicates that the software is in the processing of migration to a different server. The "migrated" indicates that processing of migration to a different server is completed.

The communication table 433 is a management table generated for each pair of communication source software and communication receiver software. For example, the communication table 433 exists for each pair of a communication source application and a communication receiver application. The communication table 433 contains fields named a communication source server ID, a communication source software ID, a communication receiver server ID, a communication receiver software ID, and a conversion target server ID. The communication source server ID indicates the server ID of a server on which the communication source software is executed. The communication source software ID indicates the software ID of the communication source software. The communication receiver server ID indicates the server ID of a server on which the communication receiver software is executed. The communication receiver software ID indicates the software ID of the communication receiver software. In the case where the communication receiver software is already migrated to a different server, the conversion target server ID indicates the server ID of the migration target server. In the initial state where the communication table 433 is registered, "Null" is registered in the field of the conversion target server ID.

For example, the following two communication tables 433 are registered in the state where the manager 110 and the agent 210 start to communicate with each other as illustrated in FIG. 6. The first communication table 433 registers the server ID of the server 100 as the communication source server ID, the software ID of the manager 110 as the communication source software ID, the server ID of the server 200 as the communication receiver server ID, and the software ID of the agent 210 as the communication receiver software ID. The second communication table 433 registers the server ID of the server 200 as the communication source server ID, the software ID of the agent 210 as the communication source software ID, the server ID of the server 100 as the communication receiver server ID, and the software ID of the manager 110 as the communication receiver software ID. For example, when the manager 110 is migrated to the server 300, the server ID of the migration target server 300 is registered as the conversion target server ID in the second communication table 433.

Next, using FIGS. 8 to 11, description is given of a migration processing example in the case where the manager 110 on the server 100 is migrated to the server 300. In FIGS. 8 to 11, the server IDs of the servers 100 200 and 300 are "server #1", "server #2" and "server #3", respectively. The software IDs of the managers 110 and 310 are "MNG".

Figure 8:
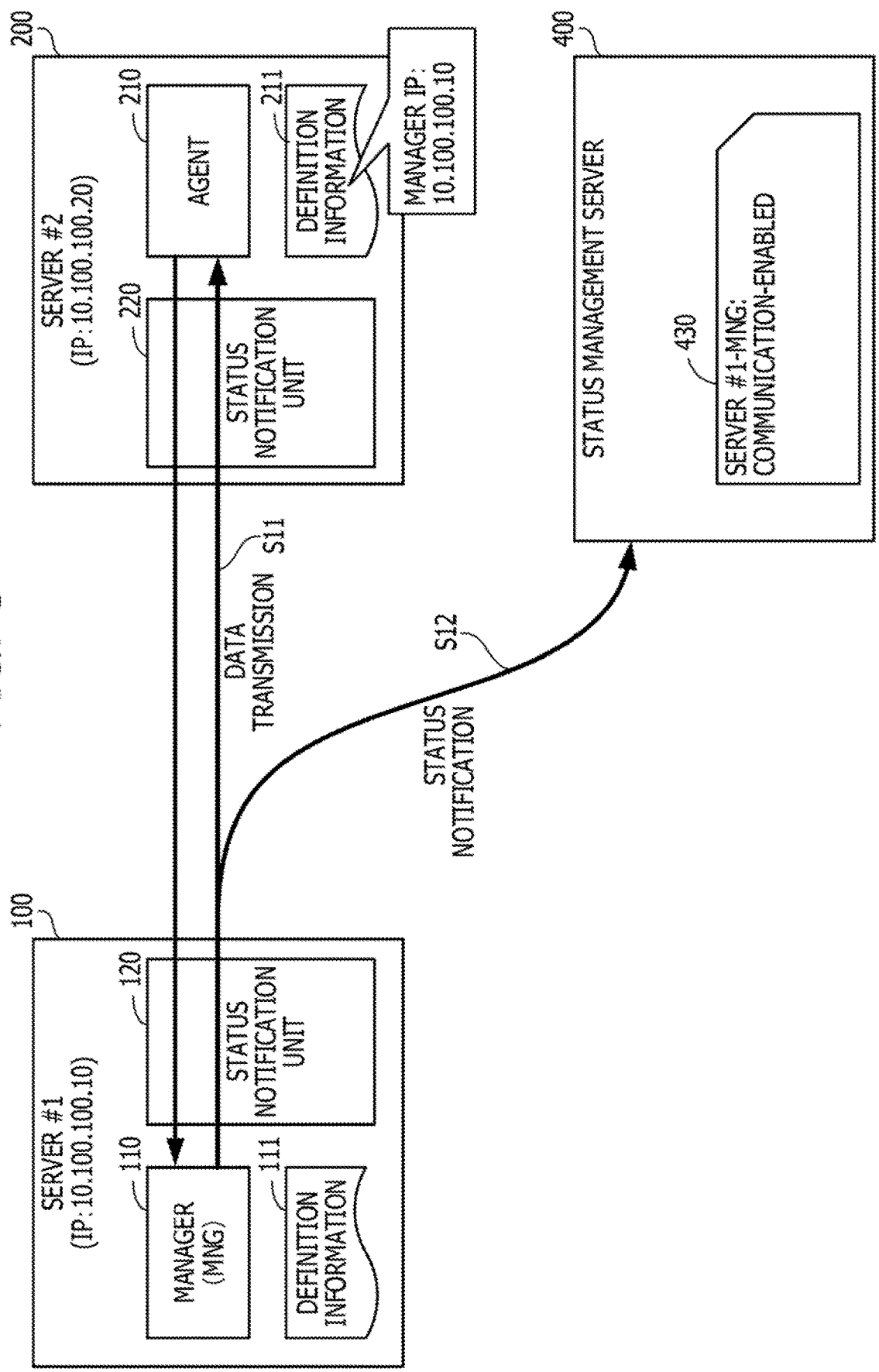
FIG. 8 is a first diagram illustrating an example of manager migration processing.

FIG. 8 is a first diagram illustrating an example of manager migration processing. As illustrated in FIG. 8, the manager 110 on the server 100 and the agent 210 on the server 200 communicate with each other. In the definition information 211 for the agent 210, the IP address "10.100.100.10" of the server 100 is set as, the communication receiver server IP address (manager IP).

The status notification unit 120 of the server 100 captures transmission information when the manager 110 transmits the information to the agent 210. The status notification unit 120 transmits the captured transmission information to the server 200 (step S11). For example, on behalf of the manager 110, the status notification unit 120 transmits the transmission information to the transmission destination. Along with this, the status notification unit 120 transmits the status notification information indicating that the manager 110 is in the communication-enabled status to the status management server 400 (step S12). The status management processing unit 410 of the status management server 400 registers the "communication-enabled" status of the manager 110 into the status management information 430. Here, "communication-enabled" is registered in the "status" field of the software table 432 for the manager 110 contained in, the status management information 430.

The status notification unit 220 of the server 200 also captures transmission information when the agent 210 transmits the information to the manager 110. The status notification unit 220 transmits the captured transmission information to the server 100, and transmits the status notification information indicating that the agent 210 is in the communication-enabled status to the status management server 400.

Figure 9:
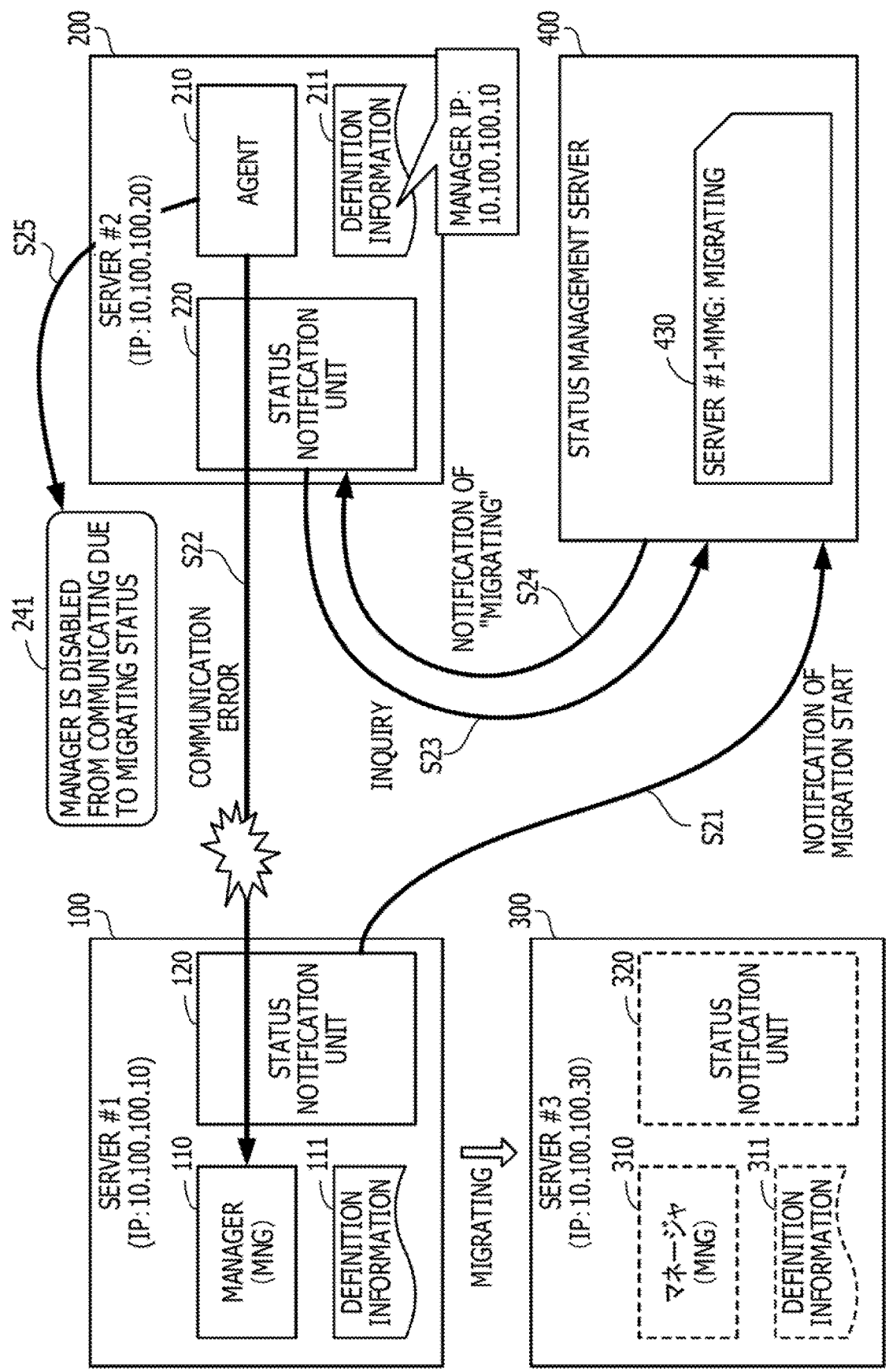
FIG. 9 is a second diagram illustrating the example of the manager migration processing.

FIG. 9 is a second diagram illustrating the example of the manager migration processing. FIG. 9 illustrates a state where the processing of migrating the manager 110 from the server 100 to the server 300 is started.

When the manager 110 notifies the status notification unit 120 of the server 100 that the processing of migrating the manager 110 to the server 300 is started, the status notification unit 120 transmits the status notification information indicating that the manager 110 is migrating to the status management server 400 (step S21). The status management processing unit 410 of the status management server 400 registers the "migrating" status of the manager 110 into the status management information 430. Here, the "status" field of the software table 432 for the manager 110 contained in the status management information 430 is updated to "migrating".

On the other hand, the status notification unit 220 of the server 200 captures transmission information when the agent 210 transmits the information to the manager 110, and transmits the captured transmission information to the server 100. However, since the communication with the manager 110 fails while the manager 110 is migrating, a communication error occurs (step S22). When the communication error occurs, the status notification unit 220 inquires of the status management server 400 the status of the manager 110 (step S23).

The status management processing unit 410 of the status management server 400 notifies the server 200 that the status of the manager 110 is "migrating" based on the status management information 430 (step S24). In response to this notification, the status notification unit 220 of the server 200 notifies the agent 210 that the manager 110 is migrating to a different server, and is disabled from communicating. Thus, the agent 210 recognizes that the manager 110 is migrating to the different server. For example, the agent 210 may cause a management terminal to display a message 241 indicating that the manager 110 is migrating to the different server and, therefore is disabled from communicating (step S25).

Then, the agent 210 tries to retransmit the transmission information to the manager 110, for example, at fixed time intervals. The agent 210 recognizes that the manager 110 is migrating based on the notification from the status notification unit 220, and thereby determines that it is possible to continue communication (it is unnecessary to stop the communication) because the manager 110 does not have a failure. Based on this determination result, the agent 210 may be controlled to try to retransmit, the transmission information. Whenever capturing transmission information outputted from the agent 210 for retransmission, the status notification unit 220 executes the processing illustrated in FIG. 9.

Figure 10:
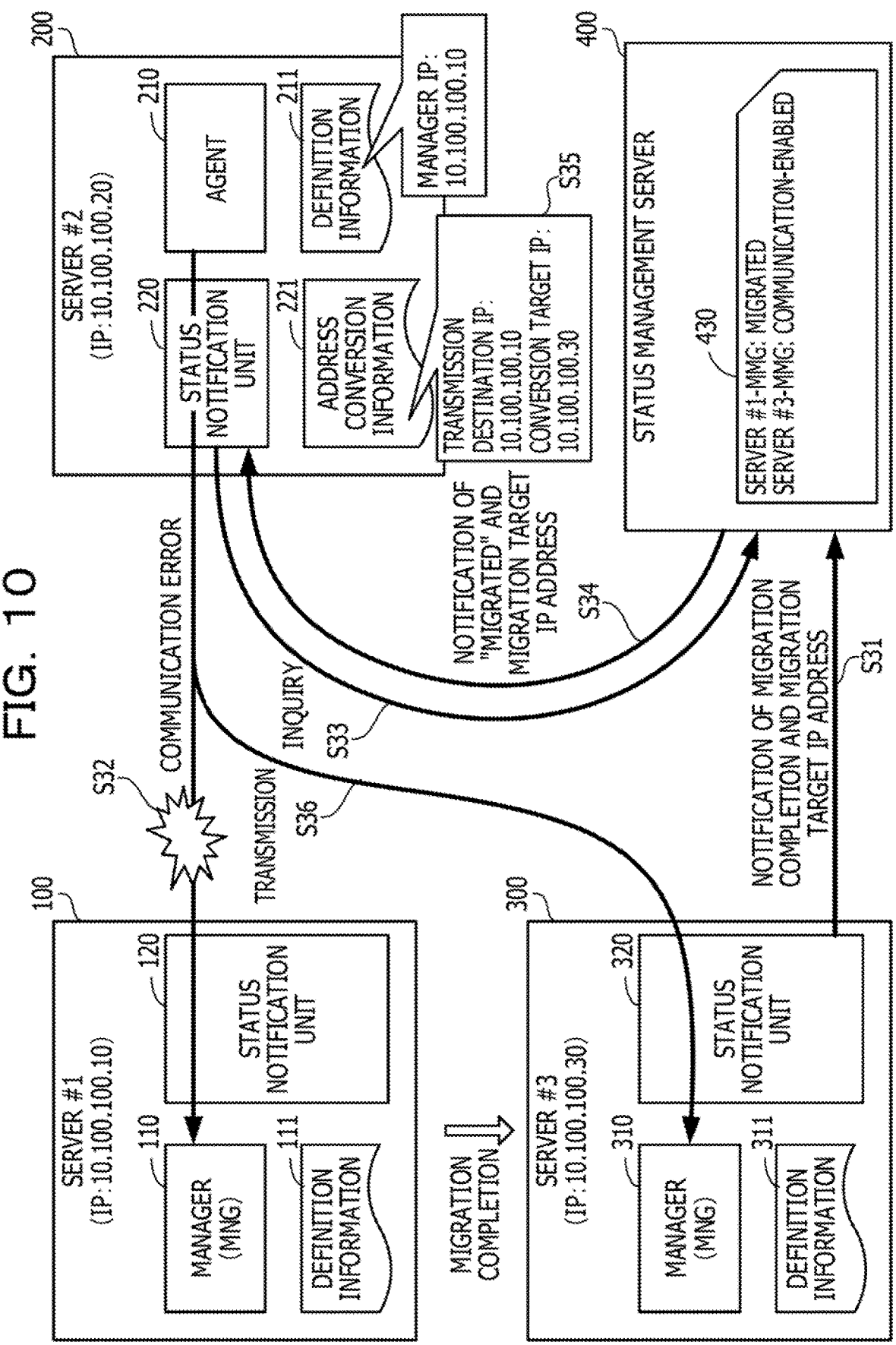
FIG. 10 is a third diagram illustrating the example of manager migration processing.

FIG. 10 is a third diagram illustrating the example of the manager migration processing. FIG. 10 illustrates a state where the processing of migrating the manager 110 from the server 100 to the server 300 is completed. At this time, the manager 310 and the status notification unit 320 are activated on the server 300.

When the manager 310 is installed upon completion of the migration processing of the manager 110, the status notification unit 320 of the server 300 transmits the status notification information indicating that the manager 110 is already migrated and the IP address of the migration target server 300 to the status management server 400 (step S31). The status management processing unit 410 of the status management server 400 registers the "migrated" status of the manager 110 into the status management information 430. Here, the "status" field of the software table 432 for the manager 110 contained in the status management information 430 is updated to "migrated".

Along with this, the status management processing unit 410 registers the software table 432 for the manager 310 on the migration target server 300 into the status management information 430, and registers "communication-enabled" into the status field of this software table 432. Based on the IP address notified of by the server 100, the status management processing unit 410 registers the information on the server 300 as the conversion target server associated with the communication receiver of the agent 210 into the status management information 430. For instance, the server ID of the server 300 is registered in the field of the conversion target server ID in the communication table 433 in which the IDs of the sever 200 and the agent 210 are registered as the communication source server ID and the communication source software ID, respectively, and the IDs of the server 100 and the manager 110 are registered as the communication receiver server ID and the communication receiver software ID, respectively.

On the other hand, the agent 210 on the server 200 tries to retransmit the transmission information to the manager 110. The status notification unit 220 captures the transmission information and transmits the transmission information to the manager 110, but a communication error occurs as in the case of FIG. 9 (step S32). Then, the status notification unit 220 inquires of the status management server 400 the status of the manager 110 (step S33).

Based on the status management information 430, the status management processing unit 410 of the status management server 400 notifies the server 200 of the "migrated" status of the manager 110 and the IP address of the migration target server 300 (step S34). The status notification unit 220 of the server 200 generates the address conversion information 221 for the agent 210 based on the notification (step S35). In this address conversion information 221, the IP address of the server 100 which is the original transmission destination and the IP address of the server 300 notified of as the conversion target server IP address are registered in association with each other.

The status notification unit 220 retransmits the captured transmission information with the IP address of the transmission destination of the transmission information converted to the conversion target server address based on the address, conversion information 221. Thus, the transmission information is transmitted to the migration target server 300, and is received by the post-migration manager 310 (step S36).

Figure 11:
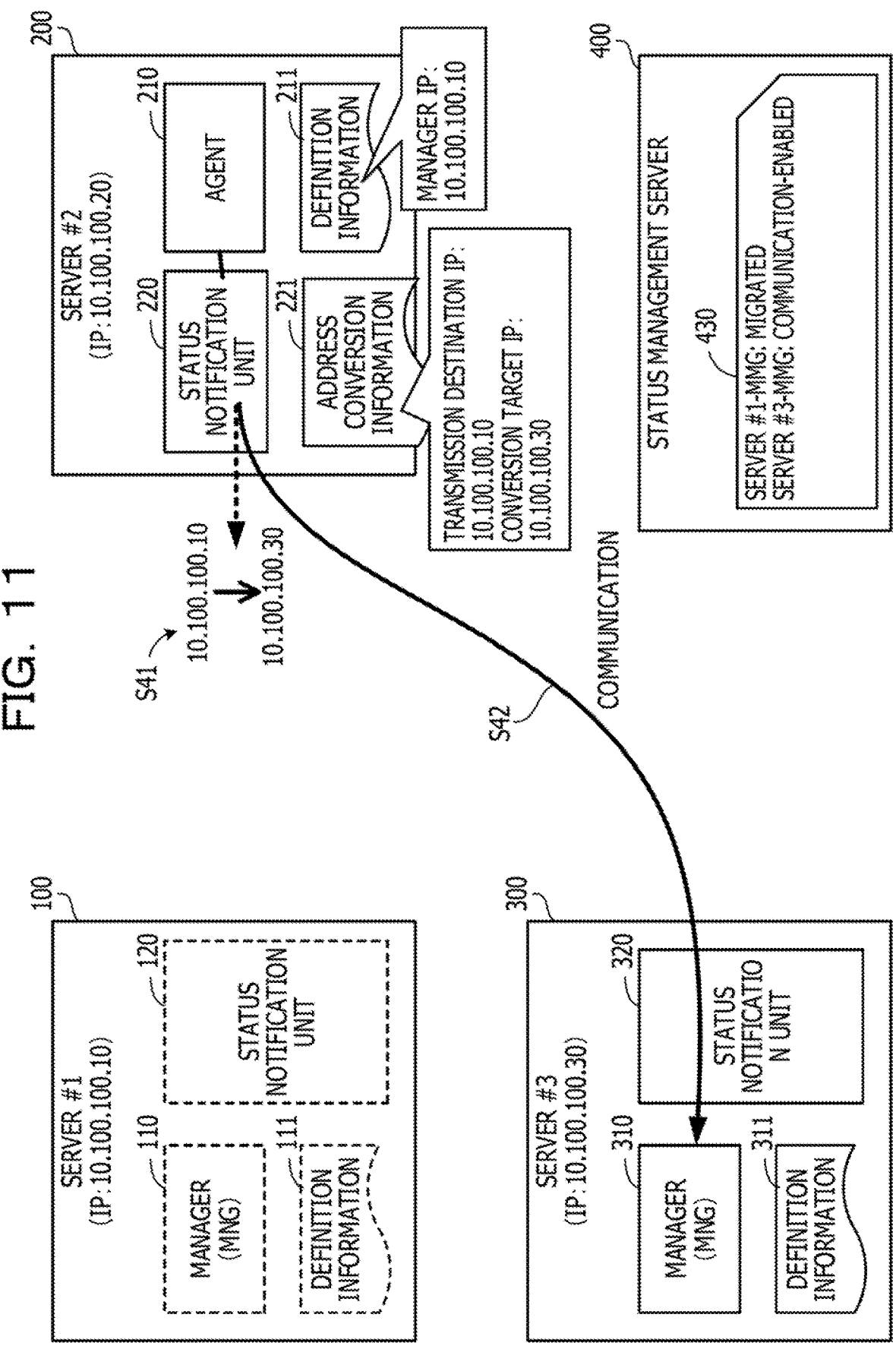
FIG. 11 is a fourth diagram illustrating the example of the manager migration processing.

FIG. 11 is a fourth diagram illustrating the example of the manager migration processing. FIG. 11 illustrates the case where after the transmission information from the agent 210 is transmitted to the migration target server 300 as illustrated in FIG. 10, the agent 210 further outputs transmission information addressed to the manager 110 that, used to run on the server 100.

When capturing the transmission information in which the IP address of the server 100 and the software ID of the manager 110 are specified as the transmission destination from the agent 210, the status notification unit 220 converts the IP address of the transmission destination to the conversion target IP address based on the address conversion information 221 (step S41). The status notification unit 220 transmits the transmission information in which the IP address is converted. Thus, the transmission information is transmitted to the migration target server 300, and is received by the manager 310 (step S42). In this way, the status notification unit 220 transmits, to the manager 310, all the transmission information addressed from the agent 210 to the manager 110.

When receiving, from the server 300, transmission information addressed from the manager 310 to the agent 210, the status notification unit 220 converts the IP address of the transmission source to the IP address of the migration source server 100 based on the address conversion information 221. The status notification unit 220 outputs, to the agent 210, the transmission information in which the IP address of the transmission source is converted.

This enables the agent 210 and the post-migration manager 310 to communicate with each other. Through the processing by the status notification it 220, the agent 210 is enabled to continue the communication without noticing that the communication receiver manager 110 is migrated.

Through the processing in FIGS. 8 to 11, the status management server 400 manages the status for each combination of servers and applications. When an application is migrated from a server to another server, the information on the migration target server is also managed by the status management server 400. When an application on the server 200 on one side fails to communicate with an application on the server 100 on the other side due to a migration of the latter application, the application on the server 200 is able to recognize that the communication fails cue to the migration by making the inquiry to the status management server 400 from the status notification unit 220.

When a communication receiver application is migrated to a different server, the status notification unit 220 obtains the information on the migration target server from the status management server 400, and generates the address conversion information 221. After that, the status notification unit 220 continues the communication by automatically switching the communication receiver to the post-migration application on the migration target server using the address conversion information 221. Even when a communication receiver application is migrated from a server to another server, this enables the communication to continue without manually resetting the IP address of the communication receiver. As a result, it is possible to enhance the work efficiency of the administrator.

The status notification unit for each application is introduced. The status notification unit is configured to be able to perform, on behalf of the application, communication of the application with a different application, and obtain the status of the different application from the status management server 400. This configuration is capable of producing the above effects without changing the existing software for the application.

In a state where applications normally communicate with each other, the status management server 400 is notified of the status of one of the applications when the one application transits information to the other application. This processing achieves reduction of the processing loads on the servers on which the applications run and simplification of the processing as compared with the case where the status management server 400 is notified of the statuses of the applications through a process independent of the communication between the applications, for example, on a regular basis. This is also expected to produce an effect of reducing the communication load on the network 600 through which the servers are coupled to each other and the servers and the status management server are coupled to each other.

The status management server 400 does not detect the status of the application by making a request from the status management server 400 by polling or the like, but recognizes the status of the application through the autonomous transmission of the status notification information from the status notification unit of each server. In response to an inquiry from the status notification unit of each server, the status management server 400 provides the information on the status of the application. This configuration achieves simplification of the processing of the status management server 400, and reduction of the processing load thereon. The introduction of the status management server 400 and the introduction of the status notification unit to each server as described above lead to efficient achievements of the status management of each application on each server and address change along with an inter-server migration of the application.

Thus, it is possible to notify a given server which fails to communicate with an application on a different server and the application on the given server of information for determining whether it is possible to continue the communication and determining a procedure to continue the communication through the simple processing by way of the simple mechanism.

Next, processing in the servers 100, 200 and 300 is described by using flowcharts. The following description explains the case where the manager 110 on the server 100 and the agent 210 on the server 200 communicate with each other in the initial state and the manager 110 is migrated to a different server as in FIG. 8. After the manager 110 is migrated to the different server, the manager 110 is returned to the server 100 in some cases.

Figure 12:
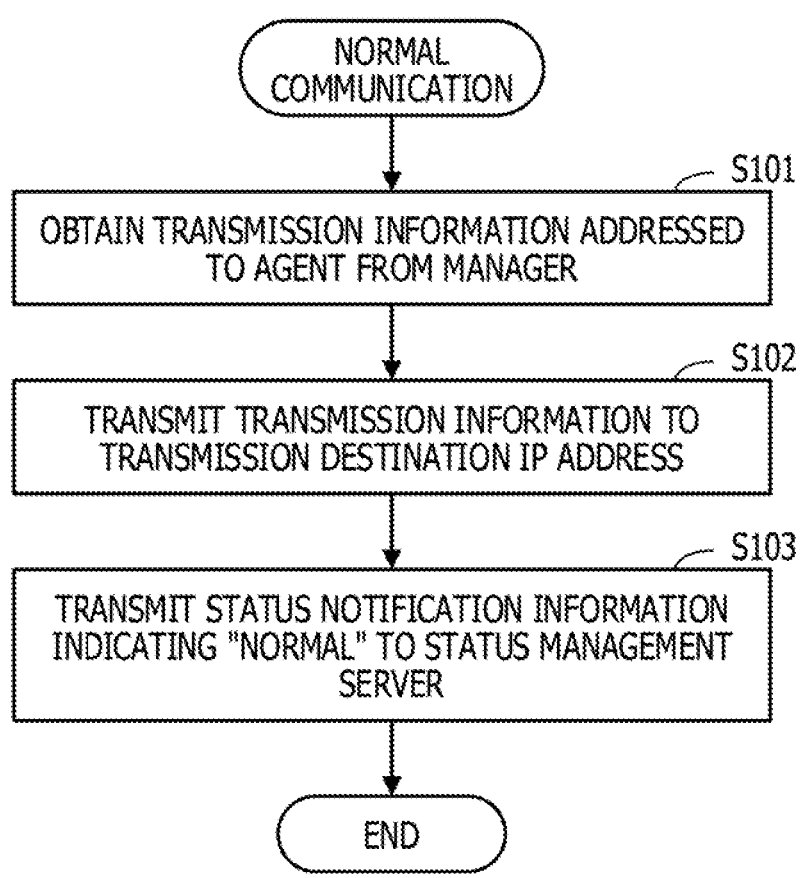
FIG. 12 is a flowchart illustrating a processing example at the time of normal communication by a manager.
Figure 13:
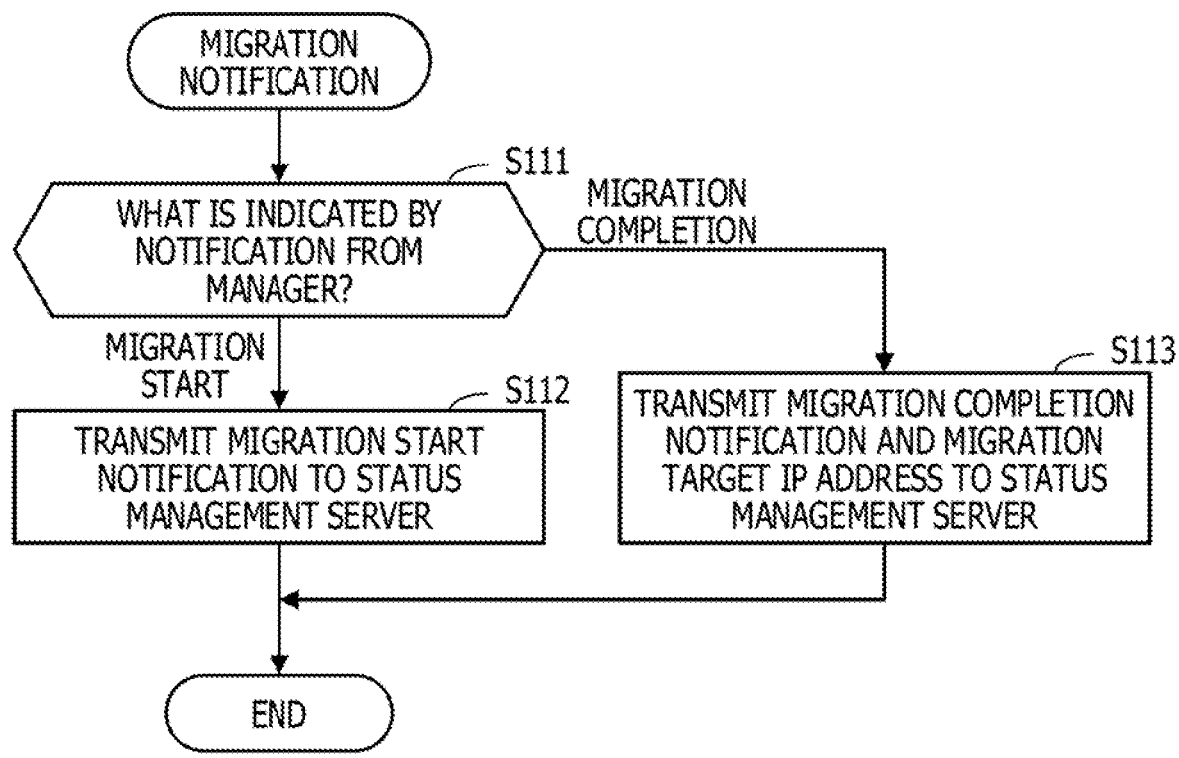
FIG. 13 is a flowchart illustrating a processing example at the time of migration notification by the manager.

Using FIGS. 12 and 13, description is given of the processing by the status notification unit (for example, the status, notification unit 120 or 320) for the manager.

FIG. 12 is a flowchart illustrating a processing example at the time of normal communication by the manager.

[Step S101] When the manager outputs transmission information addressed to the agent 210, the status notification unit obtains this transmission information. In the transmission information, the IP address of the transmission destination server 200 and the software ID of the transmission destination agent 210 are specified.

[Step S102] The status notification unit transmits the transmission information by using the specified IP address as the transmission destination. Thus, the transmission information is transmitted to the server 200.

[Step S103] The status notification unit transmits to the status management server 400 status notification information which indicates "normal" and in which the IP address of the server on which the status notification unit runs is specified as the IP address of the communication source server and the software ID of the manager is specified as the communication source software ID.

FIG. 13 is a flowchart illustrating a processing example at the time of a migration notification by the manager.

[Step S111] The manager notifies the status notification unit of the start or completion of inter-server manager migration processing. The status notification unit executes processing at step S112 when the notification indicates the migration start, or executes processing at step S113 when the notification indicates the migration completion.

[Step S112] This case is the case where the manager on, the migration source server (pre-migration manager) makes a migration start notification. The status notification unit transmits status notification information notifying of the migration start to the status management server 400 while specifying the IP address of the server on which the status notification unit runs as the IP address of the migration source server, and specifying the software ID of the manager as the software ID of the application to be migrated.

[Step S113] This case is the case where the manager on the migration target server (post-migration manager) makes a migration completion notification. The status notification unit receives the IP address of the migration source server from the manager. The status notification unit transmits status notification information notifying of the migration completion to the status management server 400 while specifying the IP address received from the manager as the IP address of the migration source server, specifying the IP address of the server on which the status notification unit runs as the IP address of the migration target server, and specifying the software ID of the manager as the software ID of the application to be migrated. Thus, the pair of the manager and the agent in the completed migration processing are specified and the IP address of the migration target server is notified of.

Although not illustrated, the status notification unit transmits status notification information indicating "service stoppage" to the status management server 400 when the service by the manager is stopped. When the operation of the manager is stopped due to a failure, the status notification unit transmits status notification information indicating "software failure" to the status management server 400. In the status notification information in any of the cases, the IP address of the server on which the status notification unit runs is specified as the IP address of the communication source server and the software ID of the manager is specified as the communication source software ID.

Figure 14:
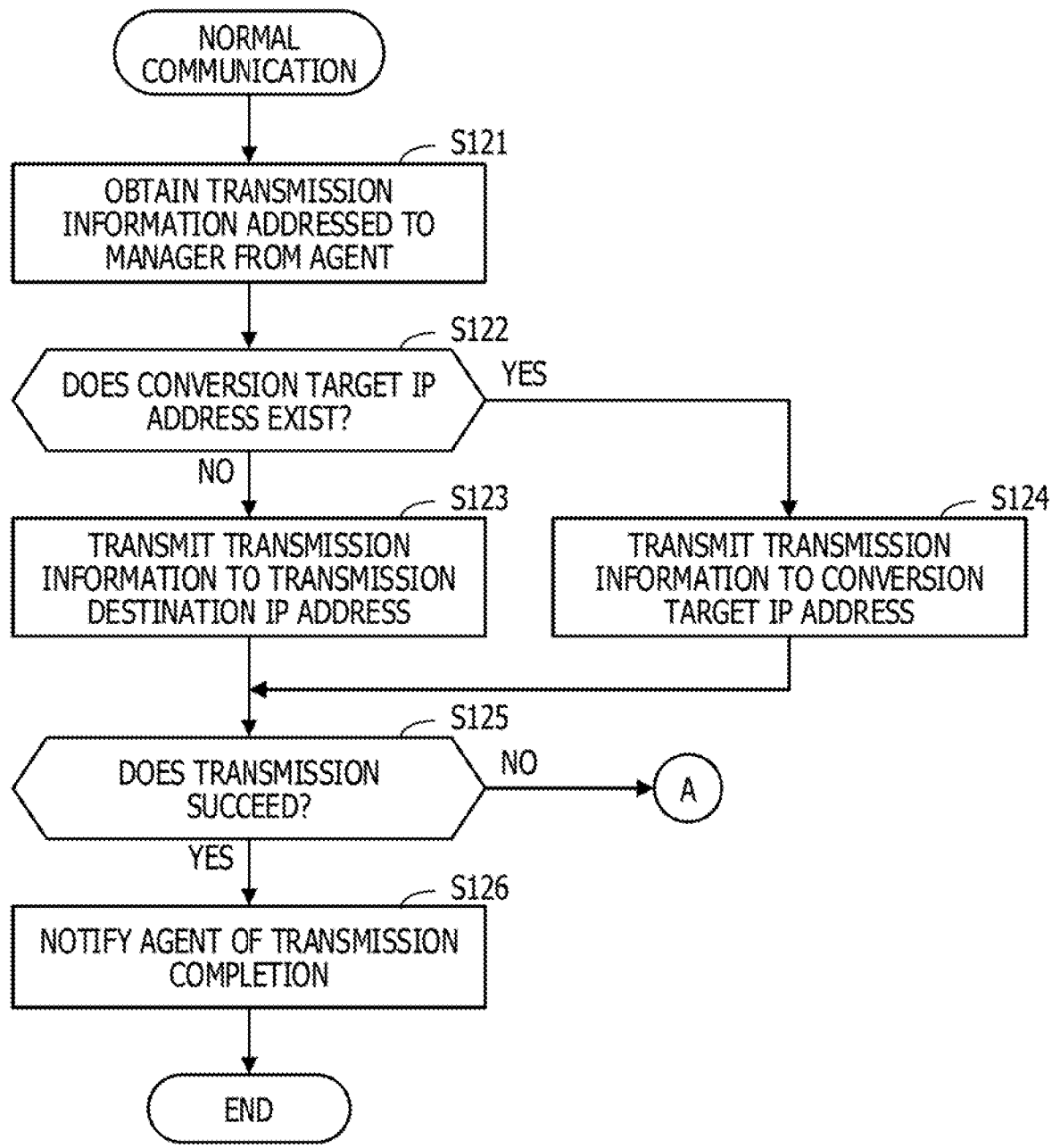
FIG. 14 is a flowchart illustrating a processing example the time of normal communication by an agent (No. 1)
Figure 15:
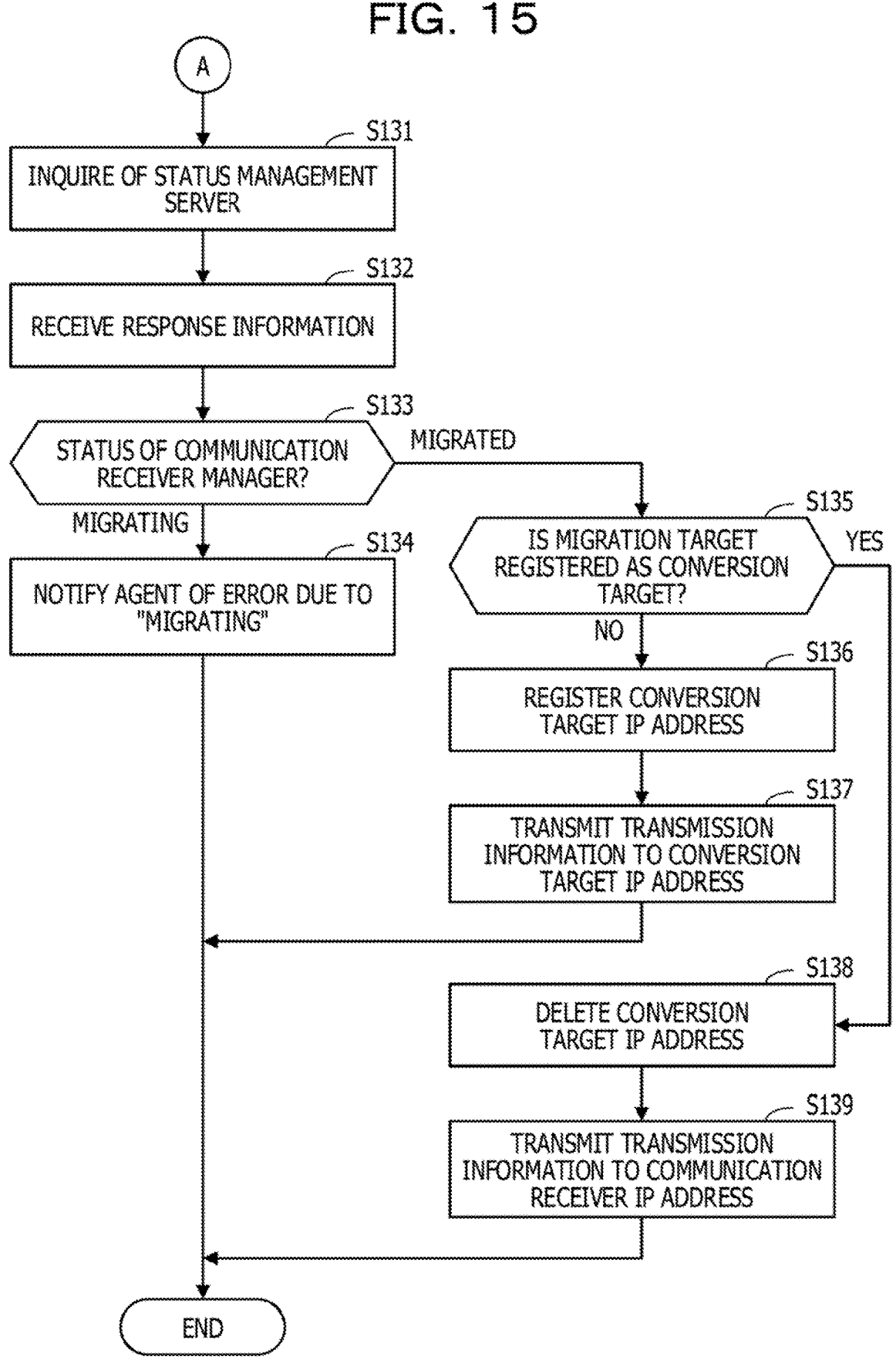
FIG. 15 is a flowchart illustrating the processing example at the time of normal communication by the agent (No. 2)

Next, description is given of processing in the status notification unit 220 for the agent 210. FIGS. 14 and 15 are a flowchart illustrating a processing example at the time of normal communication by the agent

[Step S121] When the agent 210 outputs transmission information addressed to the manager 110, the status notification unit 220 obtains this transmission information. In the transmission information, the IP address of the transmission destination server 100 and the software ID of the transmission destination manager 110 are specified.

[Step S122] The status notification unit 220 determines whether there is a conversion target IP address for communication from the agent 210 to the manager 110. In practice, when the address conversion information 221 for the agent 210 is registered in the memory unit 230, the status notification unit 220 determines that there is the conversion target IP address. The status notification unit 220 executes processing at step S123 when there is not the conversion target IP address, or executes processing at step S124 when there is the conversion target IP address.

[Step S123] The status notification unit 220 transmits the transmission information by using the IP address specified in the transmission information as the transmission destination. Thus, the transmission information is transmitted to the server 100.

[Step S124] The status notification unit 220 reads the conversion target IP address from the address conversion information 221 for the agent 210, and transmits the transmission information by using this conversion target IP address as the transmission destination. Thus, the transmission information is transmitted to the migration target server (the server other than the server 100).

[Step S125] The status notification unit 220 executes processing at step S126 when the transmission of the transmission information succeeds, or executes processing at step S131 in FIG. 15 when the transmission of the transmission information fails (when a communication error occurs).

[Step S126] The status notification unit 220 notifies the agent 210 that the transmission is normally completed. Hereinafter the description is continued by using FIG. 15.

[Step S131] The status notification unit 220 inquires of the status management server 400 the status of the communication receiver manager while specifying the IP address of the transmission destination server (communication receiver server) of the transmission information and the software ID of the manager 110. The "communication receiver manager" mentioned herein includes the manager of the actual transmission destination of the transmission information at step S123 or S124, When the manager is migrated, the communication receiver manager does not mean the manager 110 but means the manager on the migration target server.

[Step S132] The status notification unit 220 receives response information from the status management server 400.

[Step S133] The status notification unit 220 determines the status of the communication receiver manager based on the response information. The status notification unit 220 executes processing at step S134 when the communication receiver manager is "migrating", or executes processing at step S135 when the communication receiver manager is "migrated".

[Step S134] The status notification unit 220 notifies the agent 210 that a communication error occurs because the communication receiver manager is "migrating". Thus, the agent 210 may cause the management terminal to display, for example, a message indicating that the communication receiver manager is executing the inter-server migration processing and therefore is disabled from communicating.

[Step S135] When the communication receiver manager is "migrated", the response information received from the status management server 400 contains the IP address of the migration target server in the migration processing. The status notification unit 220 determines whether the IP address of the migration target server contained in the response information is registered as the conversion target IP address in the address conversion information 221 for the agent 210. The address conversion information 221 for the agent 210 is the address conversion information 221 in which the software ID of the agent 210 is registered as the communication source software ID and the IP address of the server 200 is registered as the IP address of the communication source server. The status notification unit 220 executes processing at step S136 when the IP address is not registered, or executes processing at step S138 when the IP address is registered.

[Step S136] When the address conversion information 221 for the agent 210 is not stored in the memory unit 230, the status notification unit 220 generates the address conversion information 221 and stores it into the memory unit 230. The status notification unit 220 registers the IP address of the migration target server contained in the response information as the conversion target IP address into the generated address conversion information 221. On the other hand, when the address conversion information 221 for the agent 210 is already stored in the memory unit 230, the status notification unit 220 updates the conversion target IP address in this address conversion, information 221 to the IP address of the migration target server contained in the response information.

[Step S137] The status notification unit 220 retransmits the transmission information obtained at step S121 in FIG. 14 by using the conversion target IP address registered in the address conversion information 221 as the transmission destination. Thus, the transmission information is transmitted to the migration target server (the server other than the server 180).

[Step S138] The case where "Yes" is determined at step S135 is the case where the server 100 returns as the migration target server of the manager. In this case, the status notification unit 220 deletes the conversion target IP address. For instance, the status notification unit 220 deletes the address conversion information 221 for the agent 210 from the memory unit 230.

[Step S139] The status notification unit 220 transmits the transmission information by using the IP address specified in the transmission information obtained at step S121 in FIG. 14 as the transmission destination, Thus, the transmission information is transmitted to the server 100.

Although not illustrated, when the status of the communication receiver manager based on the response information is "service stoppage" at step S133, the agent 210 is notified that a communication error occurs because the status of the communication receiver manager is "service stoppage" at step S134. When the status of the communication receiver manager based on the response information is "software failure" at step S133, the agent 210 is notified that a communication error occurs because the status of the communication receiver manager is "software failure" at step S134. The processing as described above enables the agent 210 to cause the management terminal to display, for example, a message indicating that the communication receiver manager is disabled from communicating because of the service stoppage or the occurrence of the software failure.

Instead, when the status of the communication receiver manager based on the response information is "communication-enabled" at step S133, the agent 210 is notified that the communication receiver manager is in the "communication-enabled" status at step S134. In this case, the status notification unit 220 may notify the agent 210 that the cause for the communication error does not exist in the communication receiver manager. In any of the cases, the agent 210 may cause the management terminal to display, for example, a message indicating that the communication error occurs due to an unknown cause or the communication error occurs due to a cause other than a failure in the communication receiver manager. The agent 210 may try to retransmit the transmission information because the communication receiver manager is in the "communication-enabled" status.

Figure 16:
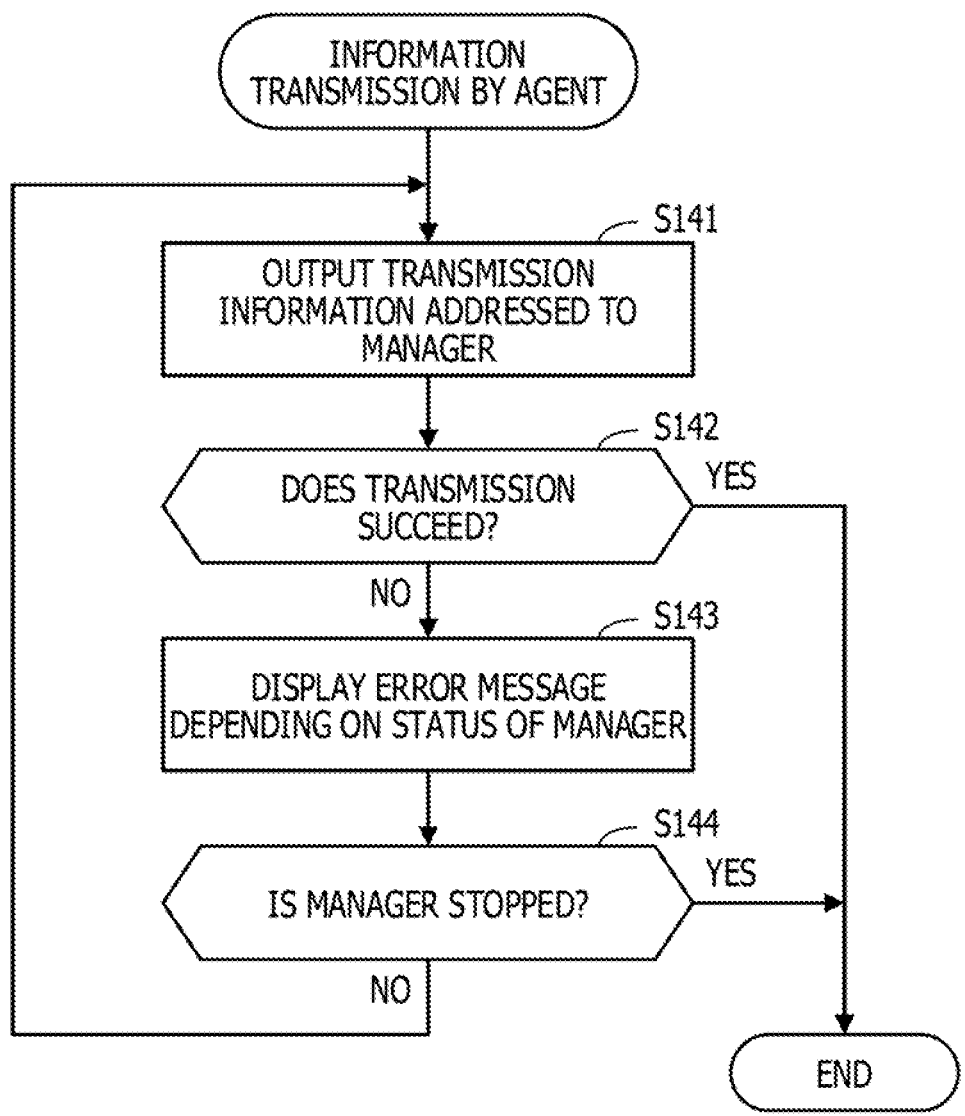
FIG. 16 is a flowchart illustrating a processing example of information transmission by an agent.

FIG. 16 is a flowchart illustrating a processing example of information transmission by the agent.

[Step S141] The agent 210 outputs transmission information addressed to the manager 110. In this transmission information, the agent 210 specifies the IP address of the transmission destination server 100 and the software ID of the transmission destination manager 110 based on the definition information 211.

[Step S142] Based on a notification from the status notification unit 220, the agent 210 terminates the processing when the transmission succeeds or executes processing at step S143 when the transmission fails.

[Step S143] The agent 210 causes the management terminal to display an error message depending on the status of the manager 110 notified of by the status notification unit 220.

[Step S144] The agent 210 terminates the processing when the manager 110 is stopped based on the status of the manager 110 notified of by the status notification unit 220. The case where the manager 110 is stopped is the case where the manager 110 is in the "service stoppage" or "software failure" status. On the other hand, when the manager 110 is not stopped, the agent 210 determines that it is possible to continue the communication and rem executes the processing at step S141 after a predetermined time. In this case, the same transmission information is retransmitted in the processing at, step S141.

Next, processing by the status management server 400 is described by using a flowchart.

Figure 17:
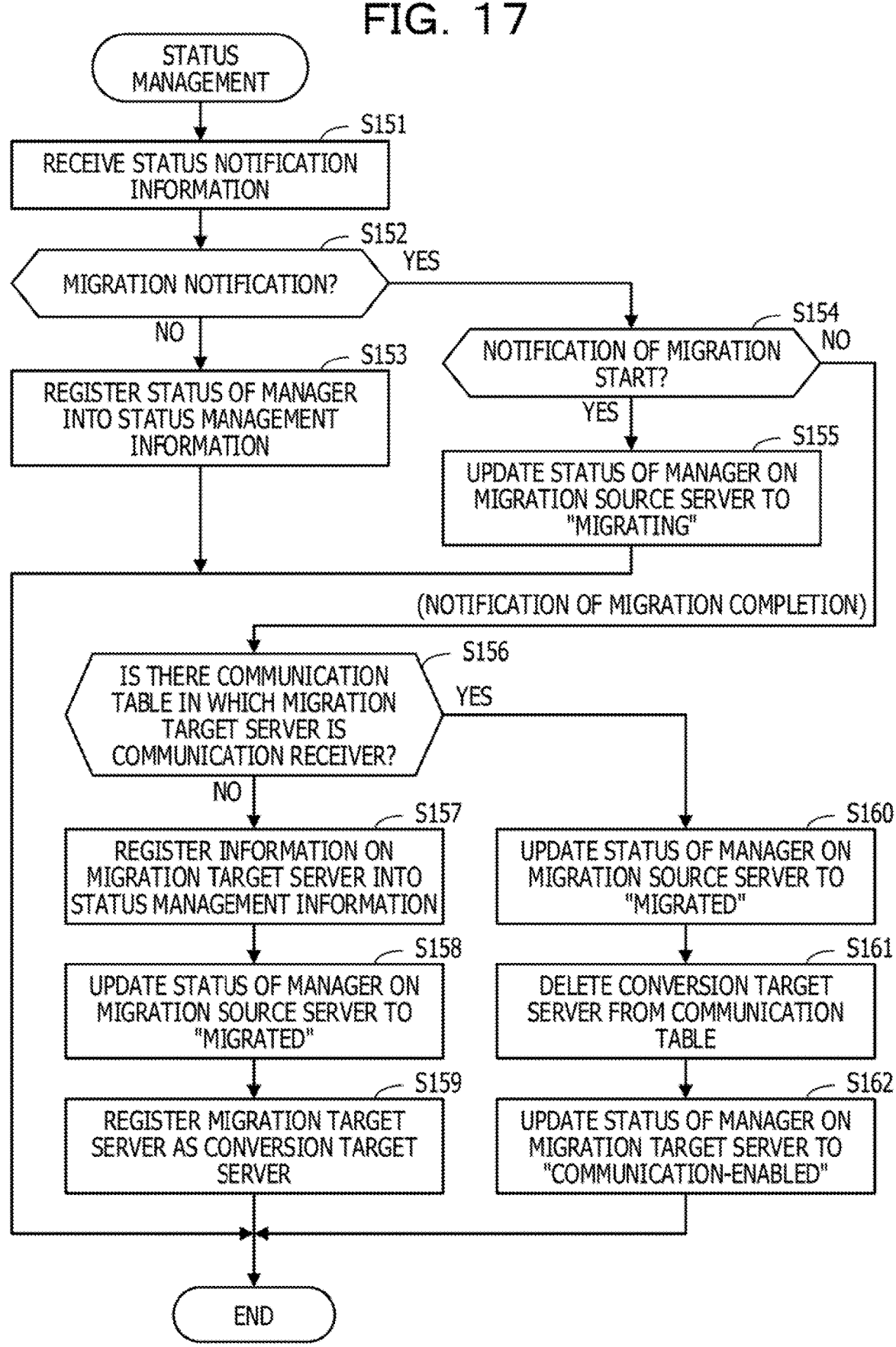
FIG. 17 is a flowchart illustrating a processing example of status management.

FIG. 17 is a flowchart illustrating a processing example of status management.

[Step S151] The status management processing unit 410 receives status notification information in which the IP address of the communication source server and the software ID are specified from the server. The IP address of the communication source server is the IP address of the transmission source server of the status notification information.

The description is continued below assuming that the software ID of the manager is specified.

[Step S152] The status management processing unit 410 executes processing at step S154 when the received status notification is a migration notification indicating migrating or migrated, or executes processing at step S153 when the notification indicates the status other than them.

[Step S153] The status management processing unit 410 registers the status indicated by the received status notification information as the status of the manager into the status management information 430. For instance, the status management processing unit 410 refers to the software table 432 in which the server ID associated with the specified IP address (the server ID of the communication source server) and the specified software ID (the software ID of the manager) are registered. The status management processing unit 410 registers the status indicated by the received status notification information into the "status" field of the reference target software table 432. In this registration, any one of "communication-enabled", "service stoppage", and "software failure" is registered. When the status information is already registered in the "status" field, this information is updated.

[Step S154] The status management processing unit 410 executes processing at step S155 when the received status notification indicates migration start, or executes processing at step S156 when the status notification indicates migration completion.

[Step S155] The status management processing unit 410 updates the status of the manager on the migration source server registered in the status management information 430 to "migrating". For instance, the status management processing unit 410 updates the information registered in the "status" field of the reference target software table 432 that is the same as that in step S153 to "migrating".

[Step S156] At step S151, when the status notification information indicating the migration completion is received, the IP address of the migration target server is also received together with this notification. At step S156, the status management processing unit 410 determines whether the status management information 430 contains the communication table 433 in which the server ID of the migration target server associated with this IP address is registered as the communication receiver server ID. The communication table 433 to be determined as to whether it is registered in this processing is more precisely the communication table 433 satisfying the following conditions.

(1) The server ID of the server 200 is registered as the communication source server ID.

(2) The software ID of the agent 210 is registered as the communication source software ID.

(3) The server ID of the migration target server associated with the IP address received together with the status notification information is registered as the communication receiver server ID.

(4) The software ID of the manager is registered as the communication receiver software ID.

The communication table 433 satisfying the above conditions is the communication table 433 which is generated at the start of the communication between the manager 110 and the agent 210 and in which the agent 210 is registered as the communication source. The server ID of the condition (1) and the software ID of the condition (2) are obtained from the communication table 433 which is generated at the start of the communication between the manager 110 and the agent 210 and in which the manager 110 is registered as the communication source.

The case where the communication table 433 satisfying the conditions (1) to (4) exists is the case where the original server 100 returns as the migration target server. In this case, the status management processing unit 410 executes processing at step S160. On the other hand, when the communication table 433 satisfying the conditions (1) to (4) does not exist, the status management processing unit 410 executes processing at step S157.

[Step S157] The status management processing unit 410 registers the information on the migration target server into the status management information 430. For instance, the status management processing unit 410 generates the software table 432 in which the server ID of the migration target server and the software ID of the manager are set, and additionally registers the software table 432 into the status management information 430. In the status field of this software table 432, "communication-enabled" is set. The status management processing unit 410 generates the following third and fourth communication tables 433 regarding communication between the agent 210 and the manager on the migration target server, and additionally registers the communication tables 433 into the status management information 430.

The third communication table 433 registers the server ID of the migration target server as the communication source server ID, the software ID of the manager as the communication source software ID, the server ID of the server 200 as the communication receiver server ID, and the software ID of the agent 210 as the communication receiver software ID. The fourth communication table 433 registers the server ID of the server 200 as the communication source server ID, the software ID of the agent 210 as the communication source software ID, the server ID of the migration target server as the communication receiver server ID, and the software ID of the manager as the communication receiver software ID. In either of the communication tables 433, "Null" is registered in the field of the conversion target server ID.

[Step S158] The status management processing unit 410 updates the status of the manager on the migration source server registered in the status management information 430 to "migrated". For instance, the status management processing unit 410 updates the information registered in the "status" field of the reference target software table 432 that is the same as that Ire step S153 to "migrated".

[Step S159] The status management processing unit 410 registers the migration target server as, the conversion target server into the status management information 430. For instance, the status management processing unit 410 registers the server ID of the migration target server in the field of the conversion target server ID of the communication table 433 which is generated at the start of the communication between the manager 110 and the agent 210 and in which the server 200 and the agent 210 are registered as the communication source. When the server ID is already registered in the field of the conversion target server ID (in the case of second or later migration), the server ID is updated to the server ID of the new migration target server.

[Step S160] As described above, the case where "Yes" is determined at step S156 is the case where the original server 100 returns as the migration target server. In this case, the status management processing unit 410 updates the status of the manager on the migration source server registered in the status management information 430 to "migrated". For instance, the status management processing unit 410 refers to the software table 432 in which the server ID of the migration source server and the software ID of the manager are set, and updates the information registered in the "status" field of this software table 432 to "migrated". The status management processing unit 410 further refers to the communication table 433 in which the server 200 is registered as the communication source out of the communication tables 433 regarding the communication between the manager on the migration source server and the agent 210 on the server 200, and registers the migration target server ID as the conversion target server ID.

[Step S161] The status management processing unit 410 delete the information on the conversion target server. For instance, the status management processing unit 410 deletes the conversion target server ID from the communication table 433 satisfying the above conditions (1) to (4).

[Step S162] The status management processing unit 410 updates the status of the manager on the migration target server registered in the status management information 430 from "migrated" to "communication-enabled". For instance, the status management processing unit 410 updates the information registered in the "status" field of the reference target software table 432 that is the same as that in step S153 to "communication-enabled".

Figure 18:
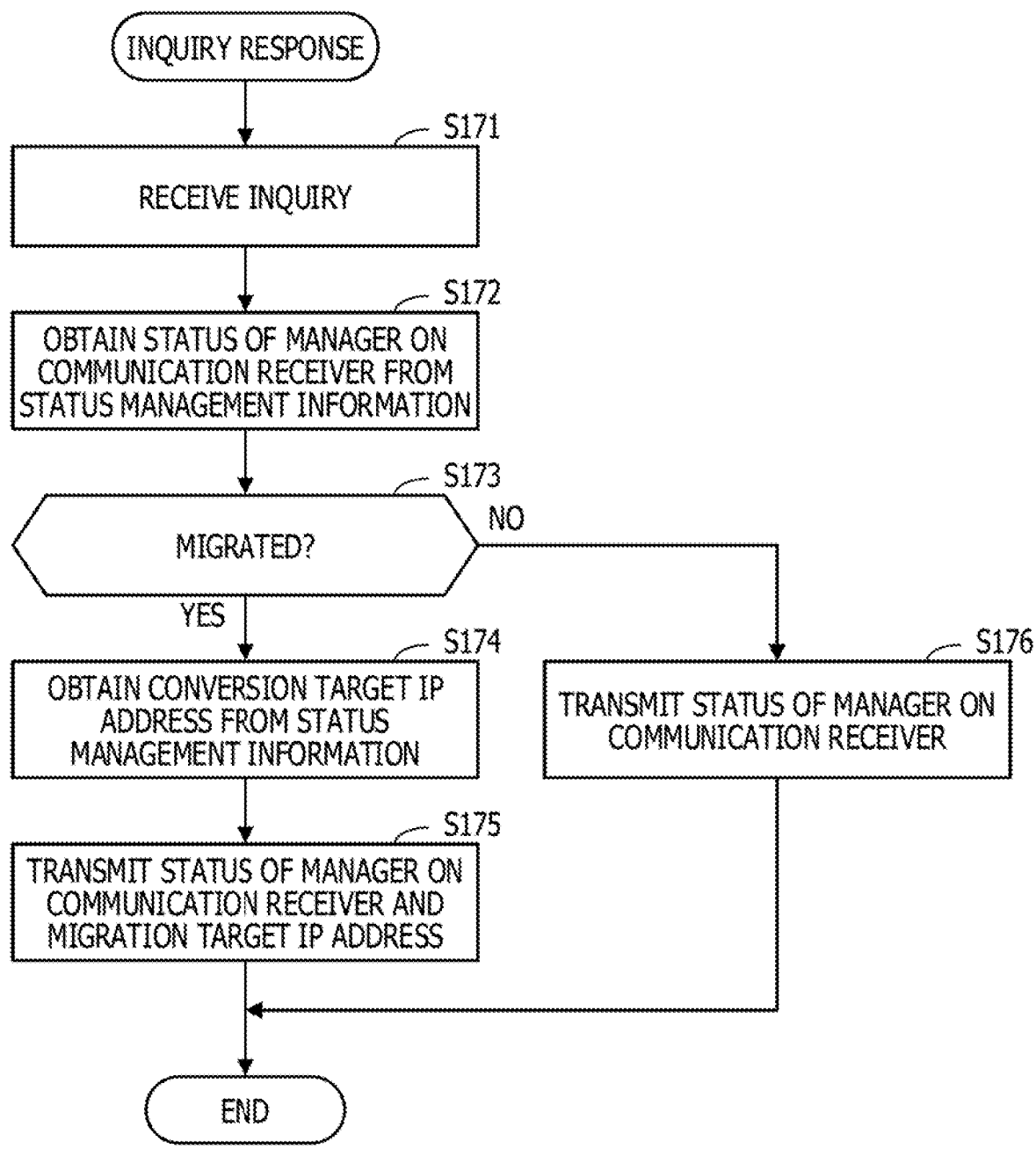
FIG. 18 is a flowchart illustrating a processing example of inquiry response.

FIG. 18 is a flowchart illustrating a processing example of inquiry response.

[Step S171] The status management processing unit 410 receives an inquiry from a server. Here, the inquiry is assumed to be received from the status notification unit 230 of the server 200. In this inquiry, the IP addresses of the communication source server and the communication receiver server and the software IDs of the agent and the manager are specified.

[Step S172] The status management processing unit 410 obtains the status of the manager on the communication receiver server from the status management information 430. For instance, the status management processing unit 410 reads the information set in the status field from the software table 432 in which the specified server ID of the communication receiver server and the specified software ID of the manager are set.

[Step S173] The status management processing unit 410 executes processing at step S174 when the status of the manager on the communication receiver server is "migrated", or executes processing at step S176 when the status of the manager is other than "migrated".

[Step S174] The status management processing unit 410 obtains the conversion target IP address from the status management information 430. For instance, the status management processing unit 410 refers to the communication table 433 specified below. In this communication table 433, the server ID of the communication source server and the server ID of the communication receiver server based on the IP addresses received at step S171 are set as the communication source server ID and the communication receiver server ID, respectively. In addition, the software ID of the agent and the software ID of the manager received at step S171 are set as the communication source software ID and the communication receiver software ID. The status management processing unit 410 reads the conversion target server ID from the reference target communication table 433 as specified above and obtains the IP address from the server table 431 in which this conversion target server ID is set.

[Step S175] The status management processing unit 410 transmits response information responding to the inquiry to the server 200. This response information contains the status of the manager obtained at step S172 and indicating "migrated". This response information also contains the conversion target IP address obtained at step S174 as the migration target server IP address.

[Step S176] The status management processing unit 410 transmits the response information containing the status of the manager obtained at step S172 to the server 200.

Figure 19:
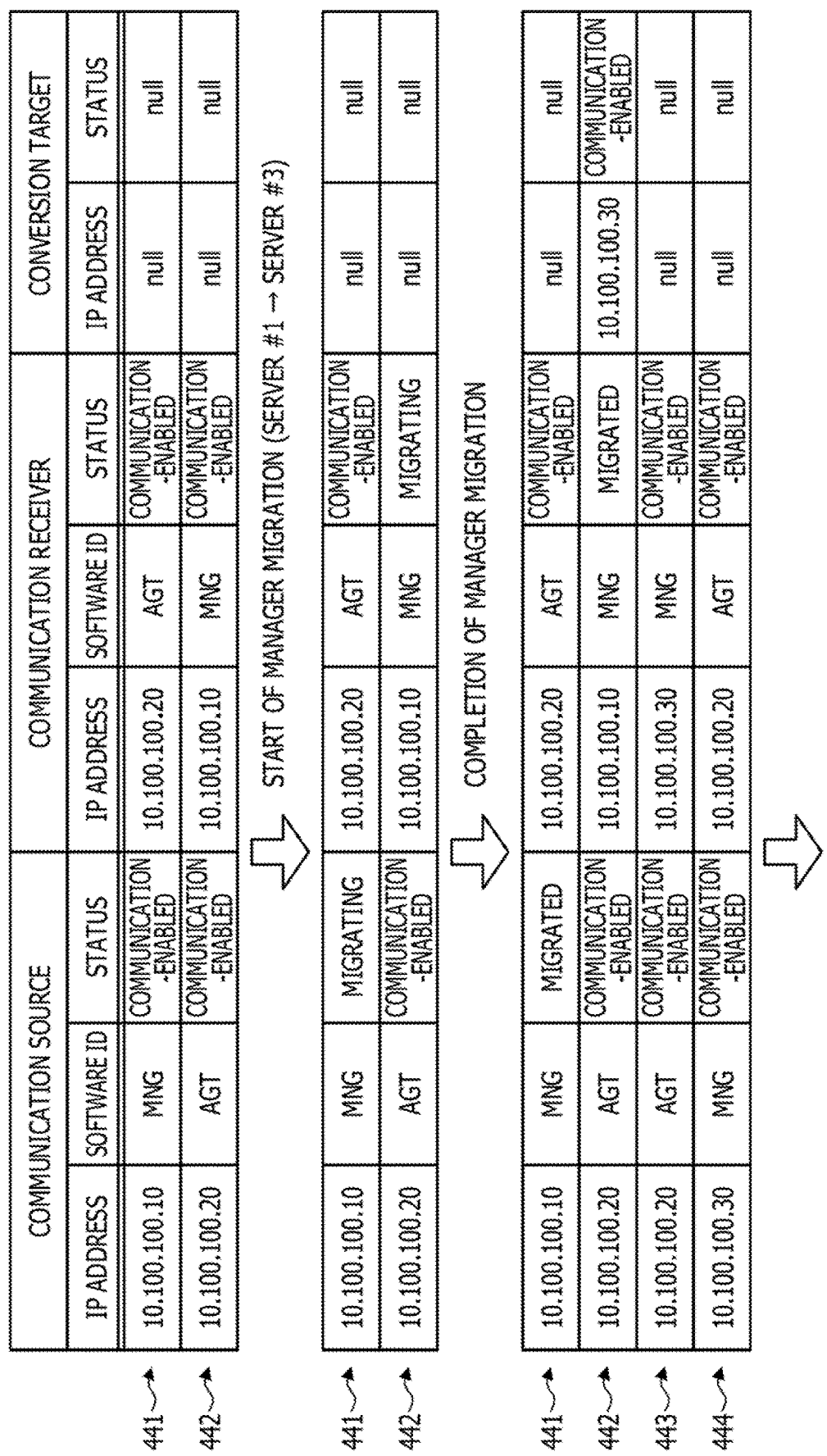
FIG. 19 is a diagram illustrating an example of transition of status management information (No. 1)

Next, using FIGS. 19 and 20, description is given of an example of transition of the status management information 430 during inter-server application migration.

FIGS. 19 and 20 are diagrams illustrating an example of transition of the status management information. Each line illustrated in FIGS. 19 and 20 presents a collection of information pieces set in the communication table 433 for the server and the software of the communication source, and in the server tables 431 and the software tables 432 to which references are made based on this communication table 433.

For example, an upper block in FIG. 19 indicates the state where the manager 110 on the server 100 and the agent 210 on the server 200 are communicating with each other. In the upper block in FIG. 19, a line 441 describes information based on the communication table 433 in which the server 100 and the manager 110 are set as the communication source and the server 200 and the agent 210 are set as the communication receiver. The IP address of the communication source is set in the server table 431 for the server 100, and the software ID and the status of the communication source are set in the software table 432 for the server 100 and the manager 110. The IP address of the communication receiver is set in the server table 431 for the server 200 and the software ID and the status of the communication receiver are set in the software table 432 for the server 200 and the agent 210.

A line 442 describes information based on the communication table 433 in which the server 200 and the agent 210 are set as the communication source and the server 100 and the manager 110 are set as the communication receiver. The IP address of the communication source is set in the server table 431 for the server 200, and the software ID and the status of the communication source are set in the software table 432 for the server 200 and the agent 210, The IP address of the communication receiver is set in the server table 431 for the server 100, and the software ID and the status of the communication receiver are set in the software table 432 for the server 100 and the manager 110.

From this state, the migration processing of migrating the manager 110 from the server 100 (server #1) to the server 300 (server #3) is assumed to be started. At this time, as presented in a middle block in FIG. 19, the status of the communication source manager 110 in the line 441 is updated from "communication-enabled" to "migrating" and the status of the communication receiver manager 110 in the line 442 is updated from "communication-enabled" to "migrating".

Next, the migration processing is assumed to be completed. At this time, as presented in a lower block in FIG. 19, information in lines 443 and 444 regarding the communication between the agent 210 and the post-migration manager 310 is registered in the status management information 430. The line 443 describes information based on the communication table 433 in which the server 200 and the agent 210 are set as the communication source and the post-migration server 300 and the manager 310 are set as the communication receiver. The IP address of the communication source is set in the server table 431 for the server 200, and the software ID and the status of the communication source are set in the software table 432 for the server 200 and the agent 210. The IP address of the communication receiver is set in the server table 431 for the server 300, and the software ID and the status of the communication receiver are set in the software table 432 for the server 300 and the manager 310.

The line 444 describes information based on the communication table 433 in which the post-migration server 300 and manager 310 are set as the communication source and the server 200 and the agent 210 are set as the communication receiver. The IP address of the communication source is set in the server table 431 for the server 300, and the software ID and the status of the communication source are set in the software table 432 for the server 300 and the manager 310. The IP address of the communication receiver is set in the server table 431 for the server 200, and the software ID and the status of the communication receiver are set in the software table 432 for the server 200 and the agent 210.

In the line 442, the IP address of the server 300 is registered as the conversion target server IP address, and "communication-enabled" is set as the status of the manager 310 on the migration target server 300. This means that the server ID of the server 300 is registered as the conversion target server ID in the communication table 433 in which the server 200 and the agent 210 are set as the communication source and the server 100 and the manager 110 are set as the communication receiver.

Next, the migration processing of migrating the manager 310 on the server 300 to the server 100, that is, returning the manager 310 to the server 100 is assumed to be started. At this time, as presented in an upper block in FIG. 20, the status of the communication receiver manager 310 in the line 443 is updated from "communication-enabled" to "migrating" and the status of the communication source manager 310 in the line 444 is updated from "communication-enabled" to "migrating".

Next, the migration processing is assumed to be completed. At this time, as presented in a lower block in FIG. 20 the status of the communication source manager 110 in the line 441 is returned to "communication-enabled" from "migrated". In the line 442, the status of the communication receiver manager 110 is returned to "communication-enabled" from "migrated", and the conversion target IP address is deleted. In the line 443 regarding the communication between the agent 210 and the pre-migration manager 310, the status of the communication receiver server is updated to "migrated", the IP address of the server 100 is registered as the conversion target IP address, and "communication-enabled" is registered as the status of the manager 110 on migration target server 100.

As presented above in FIGS. 19 and 20, the status management server 400 manages the communication status and the migration processing status of each application on each server, and the conversion target server IP address registered along with migration by using the status management information 430.

Third Embodiment

Hereinafter, description is given of a third embodiment achieved by partially modifying the processing in, the second embodiment.

Figure 21:
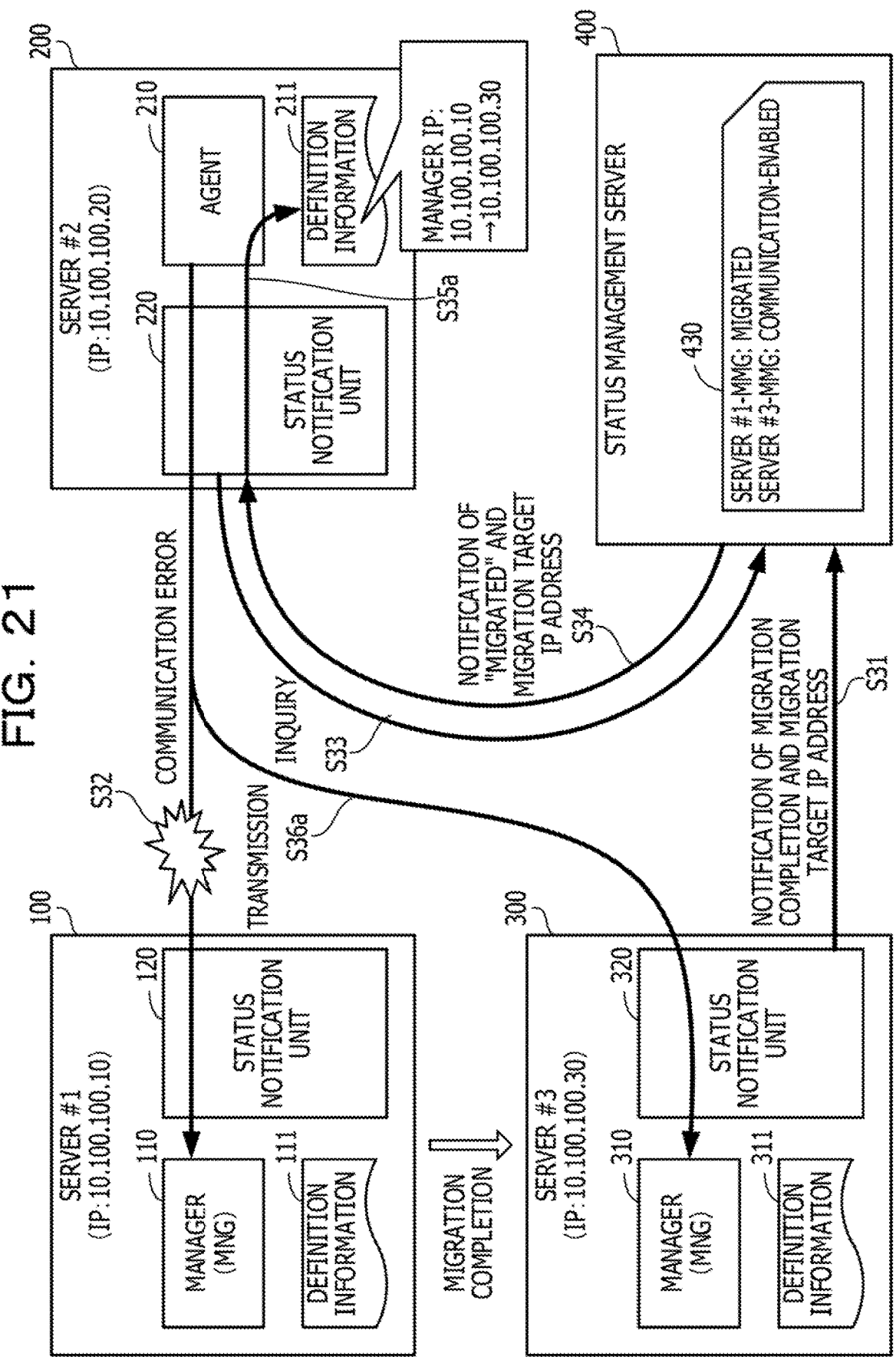
FIG. 21 is a diagram illustrating an example of manager migration processing in a third embodiment.

FIG. 21 is a diagram illustrating an example of manager migration processing in the third embodiment. In FIG. 21, constituent elements and processing steps that are the same as those in FIG. 10 are denoted with the same reference signs.

In the second embodiment, after the communication receiver manager 110 is migrated to the different server, the status notification unit 220 changes the transmission destination IP address of the transmission information from the agent 210 to the IP address of the migration target server based on the address conversion information 221 (see FIG. 10). In contrast to this, in the third embodiment, when the migration of the manager 110 is completed, the status notification unit 220 rewrites the communication receiver server IP address set in the definition information 211 for the agent 210 to the IP address of the post-migration server without using the address conversion information 221.

For instance as illustrated in FIG. 21, the processing at steps S31 to S34 after the migration of the manager 110 from the server 100 to the server 300 is completed is the same as that in FIG. 10. When the status notification unit 220 receives the notification from the status management server 400 at step S34, the status notification unit 220 notifies the agent 210 of the migrated status of the manager 110 and the IP address of the migration target server 300. The agent 210 receiving the notification rewrites the communication receiver server IP address set in definition information 211 to the IP address of the migration target server 300 (step S35a). After that, the agent 210 tries to re-transmit the transmission information to the post-migration manager 310 while specifying the IP address of the server 300 as the transmission destination based on the definition information 211. The status notification unit 220 captures this transmission information, and transmits the transmission information to the server 300 based on the specified IP address (step S36a). The status notification unit 220 transmits the transmission information from the agent 210 without performing address conversion.

Thus, in the third embodiment, when a communication receiver manager is migrated to a different server, the definition information 211 for the communication source agent 210 itself is rewritten by using the IP address of the migration target server obtained from the status management server 400. This enables the agent 210 to recognize the migration of the communication receiver manager to the different server and the migration target and thereby continue the communication with the manager on the migration target server.

Figure 22:
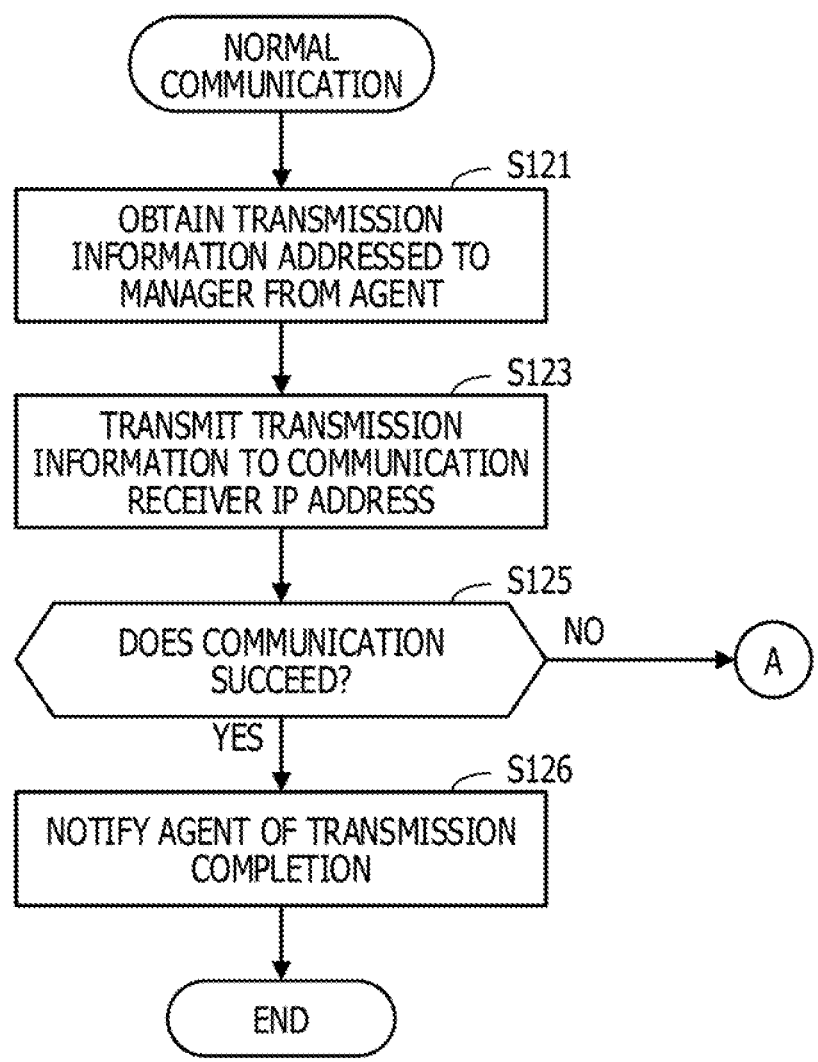
FIG. 22 is a flowchart illustrating a processing example at the time of normal communication by the agent in the third embodiment (No. 1)
Figure 23:
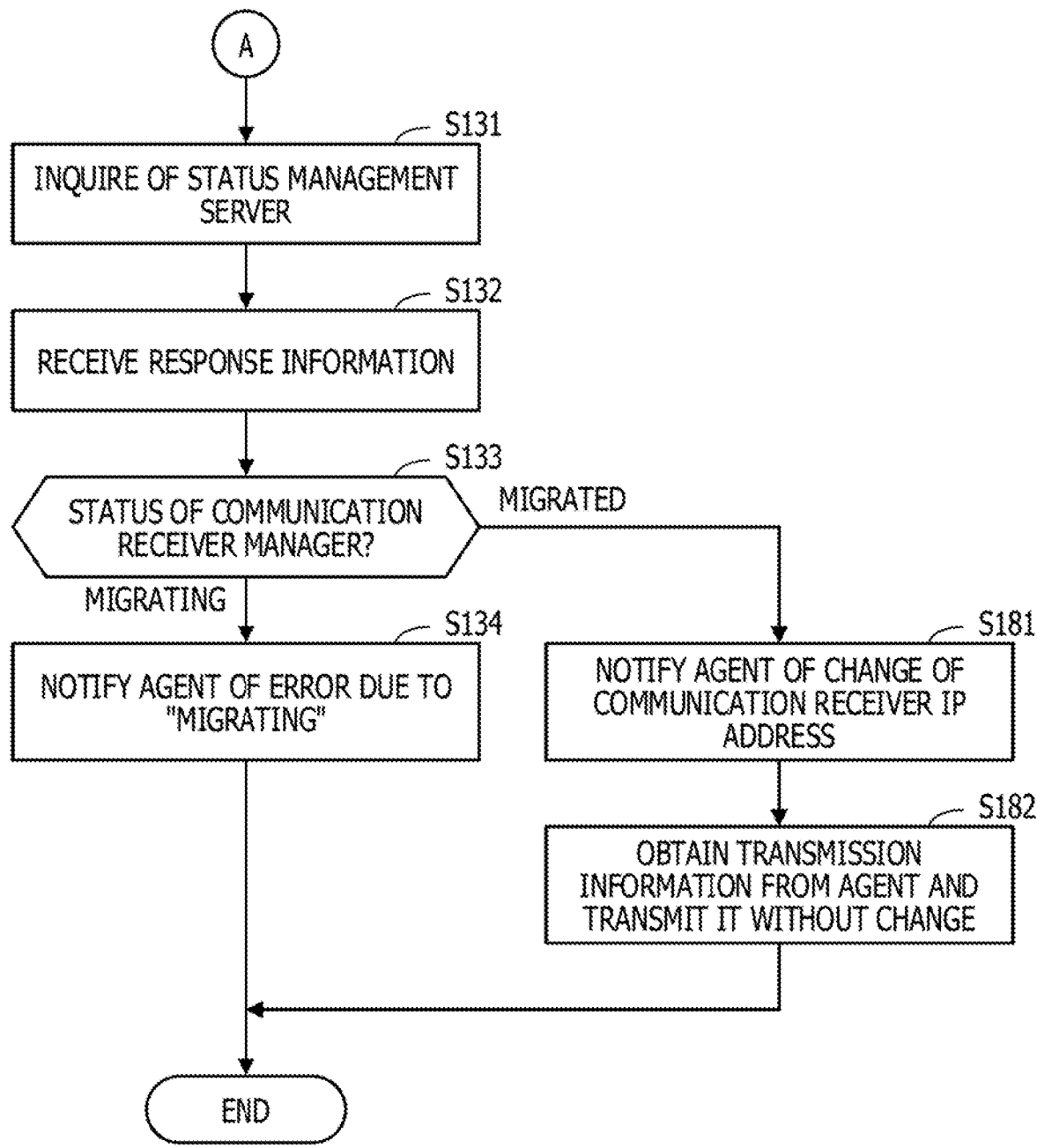
FIG. 23 is a flowchart illustrating the processing example at the time of normal communication by the agent in the third embodiment (No. 2).

FIGS. 22 and 23 are a flowchart illustrating a processing example at the time of normal communication by the agent in the third embodiment. In FIGS. 22 and 23, processing steps containing the same operations as those in FIGS. 14 and 15 are denoted with the same step numbers, and the repetitive description is omitted herein.

In FIG. 22, step S123 is executed next to step S121 and step S125 is executed next to step S123 while steps S122 and S124 in FIG. 14 are deleted. The third embodiment is different from the second embodiment in that the processing of converting the transmission destination IP address specified in transmission information to the conversion target IP address is not executed.

In FIG. 23, when the status of the communication receiver manager is determined as "migrated" at step S133, steps S181 and S182 are executed instead of steps S135 to S139 in FIG. 15.

[Step S181] The status notification unit 220 notifies the agent 210 of the "migrated" status of the communication receiver manager and the IP address of the migration target server notified of by the status management server 400. Thus, the agent 210 rewrites the IP address, registered in the definition information 211, of the server on which the communication receiver manager runs to the IP address of the migration target server notified of by the status notification unit 220. The agent 210 outputs, for retransmission, the transmission information in which the IP address after the rewriting is specified as the transmission destination based on the definition information 211 after the rewriting.

[Step S182] The status notification unit 220 obtains the transmission information outputted from the agent 210, and transmits the transmission information by using the specified IP address as the transmission destination without any change.

The status management processing by the status management processing unit 410 of the status management server 400 is the same as or similar to that in FIG. 17. The inquiry response processing by the status management processing unit 410 is the same as or similar to that in FIG. 18.

The processing functions of the apparatuses (for example, the information processing apparatuses 1 to 3, the management apparatus 10, the servers 100, 200, and 300, and the status management server 400) illustrated in each of the above embodiments may be implemented by a computer. In such a case, a program in which processing operations of the functions to be equipped in each of the apparatuses are written is provided to the computer, and the computer executes the program. Consequently, the processing functions described above are implemented on the computer. The program in which the processing operations are written may be stored on a computer-readable recording medium. Examples of the computer-readable recording medium include a magnetic memory device, an optical disc, a magneto-optical recording medium, and a semiconductor memory. Examples of the magnetic memory device include an HDD and a magnetic tape. Examples of the optical disc include a compact disc (CD), a digital versatile disc (DVD), and a Blu-ray Disc (BD, registered trademark). Examples of the magneto-optical recording medium include a magneto-optical disk (MO).

In order to distribute the program, for example, portable recording media, such as DVDs and CDs, on which the program is recorded are sold. The program may be stored in a memory device of a server computer and be transferred from the server computer to other computers via a network.

The computer that executes the program stores the program recorded on the portable recording medium or the program transferred from the server computer, for example, in its own memory device. The computer then reads the program from its own memory device and performs processing according to the program. The computer may also directly read the program from the portable, recording medium and perform the processing according to the program. Each time a program is transferred from the server computer coupled to the computer via the network, the computer may sequentially perform processing according to the received program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An application management apparatus comprising:
   a memory configured to store therein management information for managing a status of a first application running on a first information processing apparatus;
   a processor coupled to the memory and configured to:
   when receiving first status information transmitted from the first information processing apparatus in response to data transmission from the first application to a second information processing apparatus and indicating that the first application is able to normally communicate, record a status indicated by the first status information into the management information;
   when receiving second status information transmitted from the first information processing apparatus in response to a start of migration processing of migrating the first application from the first information processing apparatus to a third information processing apparatus, and indicating that the first application is migrating, record a status indicated by the second status information into the management information;
   when receiving third status information and migration target information transmitted from the third information processing apparatus in response to completion of the migration processing, the third status information indicating that the first application is already migrated, the migration target information indicating a migration target to which the first application is migrated, record a status indicated by the third status information into the management information and store the migration target information into the memory; and
   when receiving an inquiry transmitted from the second information processing apparatus in response to a failure in communication with the first application, notify the second information processing apparatus of the status of the first application based on the management information, and transmit the migration target information to the second information processing apparatus in a case where the status indicated by the third status information is recorded in the management information.

2. The application management apparatus according to claim 1, wherein
   the management information is associated with the first application and a second application running on the second information processing apparatus and communicating with the first application,
   in response to a failure in communication between the first application and the second application, the inquiry is transmitted in which identification information of the second application is specified, and
   the processor is further configured to:
   identify the management information based on the identification information specified in the received inquiry; and
   notify the second information processing apparatus of the status of the first application based on the identified management information.

3. An information processing system comprising:
   a first information processing apparatus on which a first application runs;
   a second information processing apparatus which communicates with the first application;
   a third information processing apparatus; and
   a management apparatus, wherein
   the first information processing apparatus transmits first status information indicating that the first application is able to normally communicate to the management apparatus in response to data transmission from the first application to the second information processing apparatus, and transmits, to the management apparatus, second status information indicating that the first application is migrating in response to a start of migration processing of migrating the first application from the first information processing apparatus td the third information processing apparatus,
   when the migration processing is completed, the third information processing apparatus transmits, to the management apparatus, third status information indicating that the first application is already migrated and migration target information indicating a migration target to which the first application is migrated,
   when the second information processing apparatus fails to communicate with the first application, the second information processing apparatus transmits an inquiry to the management apparatus, and
   the management apparatus includes
   a memory, and
   a processor coupled to the memory and configured to:
   when receiving the first status information, record a status indicated by the first status information into management information in the memory for managing a status of the first application;
   when receiving the second status information, record a status indicated by the second status information into the management information;
   when receiving the third status information and the migration target information, record a status indicated by the third status information into the management information and store the migration target information into the memory; and
   when receiving the inquiry, notify the second information processing apparatus of the status of the first application based on the management information, and transmit the migration target information to the second information processing apparatus in a case where the status indicated by the third status information is recorded in the management information.

4. The information processing system according to claim 3, wherein
   the second information processing apparatus transmits the inquiry when failing to transmit transmission data to the first application, and transmits the transmission data to the third information processing apparatus based on the migration target information received from the management apparatus when the first application is in a status where the migration processing is completed based on the status notified of by the management apparatus in response to transmission of the inquiry.

5. The information processing system according to claim 3, wherein a second application communicating with the first application runs on the second information processing apparatus, and the second information processing apparatus when the second application outputs first transmission data addressed to the first application with the first information processing apparatus set as a transmission destination, transmits the first transmission data to the first information processing apparatus, transmits the inquiry when failing, to transmit the first transmission data, when the first application is in a status where the migration processing is completed based on the status notified of by the management apparatus in response to the transmission of the inquiry, transmits the first transmission data to the third information processing apparatus based on the migration target information received from the management apparatus, and retains the migration target information, and when the second application outputs second transmission data addressed to the first application with the first information processing apparatus set as a transmission destination, converts the transmission destination of the second transmission data to the third information processing apparatus based on the retained migration target information, and transmits the second transmission data to the third information processing apparatus.

6. The information processing system according to claim 3, wherein a second application communicating with the first application runs on the second information processing apparatus, the second information processing apparatus retains definition information in which an address of the first information processing apparatus is set as a transmission destination address to be used for the second application to communicate with the first application, the second application specifies a transmission destination based on the definition information when transmitting transmission data to the first application, and the second information processing apparatus when the second application outputs the transmission data addressed to the first application with the first information processing apparatus specified as the transmission destination, transmits the transmission data to the first information processing apparatus, transmits the inquiry when failing to transmit the transmission data, and when the first application is in a status where the migration processing is completed based on the status notified of by the management apparatus, in response to the transmission of the inquiry, rewrites the transmission destination address set in the definition information to an address of the third information processing apparatus based on the migration target information received from the management apparatus.

7. The information processing system according to claim 3, wherein the management information is associated with the first application and a second application running on the second information processing apparatus and communicating with the first application, when communication between the second application and the first application fails, the second information processing apparatus transmits the inquiry in which identification information of the second application is specified, and the management apparatus identifies the management information based on the identification information specified in the received inquiry, and notifies the second information processing apparatus of the status of the first application based on the identified management information.

8. A non-transitory computer-readable storage medium storing therein a program causing a computer to perform a process comprising:

when receiving first status information transmitted from the first information processing apparatus in response to data transmission from the first application to a second information processing apparatus and indicating that the first application is able to normally communicate, recording a status indicated by the first status information into management information in a memory;

when receiving second status information transmitted from the first information processing apparatus in response to a start of migration processing of migrating the first application from the first information processing apparatus to a third information processing apparatus, and indicating that the first application is migrating, recording a status indicated by the second status information into the management information;

when receiving third status information and migration target information transmitted from the third information processing apparatus in response to completion of the migration processing, the third status information indicating that the first application is already migrated, the migration target information indicating a migration target to which the first application is migrated, recording a status indicated by the third status information into the management information and storing the migration target information into the memory; and when receiving an inquiry transmitted from the second information processing apparatus in response to a failure in communication with the first application, notifying the second information processing apparatus of the status of the first application based on the management information, and transmitting the migration target information to the second information processing apparatus in a case where the status indicated by the third status information is recorded in the management information.

9. The storage medium according to claim 8, wherein the management information is associated with the first application and a second application running on the second information processing apparatus and communicating with the first application, in response to a failure in communication between the first application and the second application, the inquiry is transmitted in which identification information of the second application is specified, and the process further comprising:

identifying the management information based on the identification information specified in the received inquiry; and notifying the second information processing apparatus of the status of the first application based on the identified management information.

\* \* \* \* \*